US010537855B2

(12) United States Patent
Choi et al.

(10) Patent No.: US 10,537,855 B2
(45) Date of Patent: Jan. 21, 2020

(54) METHOD OF PREPARING DECADODECASIL 3R TYPE ZEOLITE MEMBRANES AND MEMBRANES PREPARED THEREBY

(71) Applicant: KOREA UNIVERSITY RESEARCH AND BUSINESS FOUNDATION, Seoul (KR)

(72) Inventors: Jungkyu Choi, Seoul (KR); Kwan Young Lee, Seoul (KR); Eun-Joo Kim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 137 days.

(21) Appl. No.: 15/860,556

(22) Filed: Jan. 2, 2018

(65) Prior Publication Data
US 2018/0185792 A1 Jul. 5, 2018

(30) Foreign Application Priority Data
Jan. 3, 2017 (KR) ........................ 10-2017-0000680

(51) Int. Cl.
| | | |
|---|---|---|
| B01D 67/00 | (2006.01) | |
| B01D 71/02 | (2006.01) | |
| C01B 39/48 | (2006.01) | |
| B01D 53/22 | (2006.01) | |
| C01B 37/02 | (2006.01) | |
| B01D 69/10 | (2006.01) | |

(52) U.S. Cl.
CPC ....... *B01D 67/0088* (2013.01); *B01D 53/228* (2013.01); *B01D 67/0051* (2013.01); *B01D 67/0083* (2013.01); *B01D 71/028* (2013.01); *C01B 37/02* (2013.01); *C01B 39/48* (2013.01); *B01D 69/10* (2013.01); *B01D 2256/10* (2013.01); *B01D 2256/24* (2013.01); *B01D 2256/245* (2013.01); *B01D 2257/504* (2013.01); *B01D 2323/04* (2013.01); *B01D 2323/08* (2013.01); *Y02C 10/10* (2013.01)

(58) Field of Classification Search
CPC .............. B01D 53/228; B01D 67/0051; B01D 67/0083; B01D 67/0088; B01D 69/10; B01D 71/028; C01B 39/48
See application file for complete search history.

(56) References Cited

U.S. PATENT DOCUMENTS

| | | | | |
|---|---|---|---|---|
| 4,698,217 A | * | 10/1987 | Valyocsik ................ | B01J 29/70 423/277 |
| 7,973,090 B2 | | 7/2011 | Suzuki et al. | |
| 9,095,809 B2 | | 8/2015 | Deckman et al. | |
| 2009/0011926 A1 | * | 1/2009 | Yajima ................. | B01D 53/228 502/62 |
| 2009/0111959 A1 | * | 4/2009 | Cao ...................... | B01D 69/148 526/226 |
| 2010/0144512 A1 | * | 6/2010 | Uchikawa ............ | B01D 53/228 502/4 |
| 2011/0301017 A1 | * | 12/2011 | Niino ................... | B01D 71/028 502/4 |
| 2012/0183759 A1 | * | 7/2012 | Nakamura ........... | B01D 53/228 428/220 |
| 2013/0064747 A1 | | 3/2013 | Zhou et al. | |
| 2014/0157986 A1 | | 6/2014 | Ravikovitch et al. | |
| 2014/0161717 A1 | * | 6/2014 | Johnson ................ | B01D 53/04 423/704 |
| 2015/0182947 A1 | * | 7/2015 | Johnson ................ | B01D 53/02 423/704 |

FOREIGN PATENT DOCUMENTS

| | | |
|---|---|---|
| JP | WO2007058387 A1 | 5/2009 |
| JP | 2016501178 A | 1/2016 |
| KR | 101633429 B1 | 6/2016 |
| KR | 101638338 A | 7/2016 |

OTHER PUBLICATIONS

Agrawal, K. V., et al., "Oriented MFI Membranes by Gel-Less Secondary Growth of Sub-100 nm MFI-Nanosheet Seed Layers", "Advanced Materials", Apr. 11, 2015, pp. 3243-3249, vol. 27.
Bonilla, G., et al., "Fluorescence confocal optical microscopy imaging of the grain boundary structure of zeolite MFI membranes made by secondary (seeded) growth", "Journal of Membrane Science", 2001, pp. 103-109, vol. 182.
Choi, J., et al., "Grain Boundary Defect Elimination in a Zeolite Membrane by Rapid Thermal Processing", "Science", Jul. 31, 2009, pp. 590-593, vol. 325.
Gascon, J., et al., "Accelerated synthesis of all-silica DD3R and its performance in the separation of propylene/propane mixtures", "Microporous and Mesoporous Materials", Mar. 10, 2008, pp. 585-593, vol. 115.
Gouzinis, A., et al., "On the Preferred Orientation and Microstructural Manipulation of Molecular Sieve Films prepared by Secondary Growth", "Chemistry of Materials", Aug. 13, 1998, pp. 2497-2504, vol. 10, No. 9.
Gu, X., et al., "Synthesis of Defect-Free FAU-Type Zeolite Membranes and Separation for Dry and Moist CO2/N2 Mixtures", "Industrial & Engineering Chemistry Research", Jan. 20, 2005, pp. 937-944, vol. 44, No. 4.

(Continued)

*Primary Examiner* — Jason M Greene
(74) *Attorney, Agent, or Firm* — Hultquist, PLLC; Steven J. Hultquist

(57) ABSTRACT

The present invention relates to a method of preparing a decadodecasil 3R (DDR) type zeolite membrane and a membrane prepared thereby, and more particularly, to a method of preparing a hydrophobic decadodecasil 3R (DDR) type zeolite membrane having a continuous out-of-plane orientation by adding a substrate on which a seed layer is formed to a silica source synthetic precursor containing a methyltropinium salt and performing a hydrothermal synthesis, and a method of capturing and removing carbon dioxide using a membrane prepared thereby.

9 Claims, 19 Drawing Sheets
(19 of 19 Drawing Sheet(s) Filed in Color)

(56) References Cited

OTHER PUBLICATIONS

Hedlund, J., et al., "High-flux MFI membranes", "Microporous and Mesoporous Materials", 2002, pp. 179-189, vol. 52.

Himeno, S., et al., "Synthesis and Permeation Properties of a DDR-Type Zeolite Membrane for Separation of CO2/CH4 Gaseous Mixtures", "Industrial & Engineering Chemistry Research", Sep. 13, 2007, pp. 6989-6997, vol. 46, No. 21.

Jee, S. E., et al., "Carbon Dioxide and Methane Transport in DDR Zeolite: Insights from Molecular Simulations into Carbon Dioxide Separations in Small Pore Zeolites", "Journal of the American Chemical Society", May 7, 2009, pp. 7896-7904, vol. 131, No. 22.

Kalipcilar, H., et al., "Synthesis and Separation Performance of SSZ-13 Zeolite Membranes on Tubular Supports", "Chemistry of Materials", Jul. 10, 2002, pp. 3458-3464, vol. 14, No. 8.

Kasukabe, K., et al., "Formation of a Y-Type Zeolite Membrane on a Porous r-Alumina Tube for Gas Separation", "Industrial & Engineering Chemistry Research", 1997, pp. 649-655, vol. 36, No. 3.

Kim, E., et al., "Synthesis and sonication-induced assembly of Si-DDR particles for close-packed oriented layers", "Chemical Communications", 2013, pp. 7418-7420, vol. 49.

Kim, E., et al., "Chemical Vapor Deposition on Chabazite (CHA) Zeolite Membranes for !ective Post-Combustion CO2 Capture", "Environmental Science and Technology", Dec. 5, 2014, pp. 14828-14836, vol. 48.

Kim, E., et al., "Mono-dispersed DDR zeolite particles by seeded growth and their CO2, N2, and H2O adsorption properties", "Chemical Engineering Journal", Aug. 3, 2016, pp. 876-888, vol. 306.

Kosinov, N., et al., "High !ux high-silica SSZ-13 membrane for CO2 Separation", "Journal of Materials Chemistry A", 2014, pp. 13083-13092, vol. 2.

Krishna, R., et al., "In silico screening of zeolite membranes for CO2 capture", "Journal of Membrane Science", Jun. 1, 2010, pp. 323-333, vol. 360.

Krishna, R., "Separating mixtures by exploiting molecular packing effects in microporous materials", "Physical Chemistry Chemical Physics", 2015, pp. 39-59, vol. 17.

Kusakabe, K., et al., "Separation of carbon dioxide from nitrogen using ion-exchanged faujasite-type zeolite membranes formed on porous support tubes", "Journal of Membrane Science", 1998, pp. 13-23, vol. 148.

Kusakabe, K., et al., "Gas Permeation Properties of Ion-Exchanged Faujasite-Type Zeolite Membranes", "American Institute of Chemical Engineers", Jun. 1999, pp. 1220-1226, vol. 45, No. 6.

Lee, T., et al., "On the performance of c-oriented MFI zeolite Membranes treated by rapid thermal processing", "Journal of Membrane Science", Feb. 20, 2013, pp. 79-89, vol. 439.

Li, S., et al., "High-Flux SAPO-34 Membrane for CO2/N2 Separation", "Industrial & Engineering Chemistry Research", Mar. 29, 2010, pp. 4399-4404, vol. 49, No. 9.

Mavroudi, M., et al., "Reduction of CO2 emissions by a membrane contacting process", "Fuel", Jun. 12, 2003, pp. 2153-2159, vol. 82.

McDonald, T. M., et al., "Capture of Carbon Dioxide from Air and Flue Gas in the Alkylamine-Appended MetalOrganic Framework mmen-Mg2(dobpdc)", "Journal of the American Chemical Society", Apr. 4, 2012, pp. 7056-7065, vol. 134.

Merkel, T. C., et al., "Power plant post-combustion carbon dioxide capture: An opportunity for membranes", "Journal of Membrane Science", Nov. 4, 2009, pp. 126-139, vol. 359.

Saint Remi, J. C., et al., "The role of crystal diversity in understanding mass transfer in nanoporous materials", "Nature Materials", Apr. 2016, pp. 401-406, vol. 15.

Snider, M. T., et al., "Gas sorption studies on Zeolite Y membrane materials for post-combustion CO2 capture in coal-fired plants", "Microporous and Mesoporous Materials", Oct. 25, 2013, pp. 37, vol. 192.

Tomita, T., et al., "Gas separation characteristics of DDR type zeolite membrane", "Microporous and Mesoporous Materials", 2004, pp. 71-75, vol. 68.

Wang, Y., et al., "Adsorption Equilibrium of Carbon Dioxide and Water Vapor on Zeolites 5A and 13X and Silica Gel: Pure Components", "Journal of Chemical & Engineering Data", Jun. 11, 2009, pp. 2839-2844, vol. 54, No. 10.

Wang, Y., et al., "Adsorption Equilibrium of Binary Mixtures of Carbon Dioxide and Water Vapor on Zeolites 5A and 13X", "Journal of Chemical & Engineering Data", Jun. 4, 2010, pp. 3189-3195, vol. 55, No. 9.

Zhai, H., et al., "Techno-Economic Assessment of Polymer Membrane Systems for Postcombustion Carbon Capture at Coal-Fired Power Plants", "Environmental Science & Technology", Feb. 13, 2013, pp. 3006-3014, vol. 47.

Zhang, L., et al., "Direct assessment of molecular transport in mordenite: dominance of surface resistances", "Chemical Communications", Sep. 8, 2009, pp. 6424-6426.

Note: For the non-patent literature citations that no month of publication is indicated, the year of publication is more than 1 year prior to the effective filing date of the present application.

Lee, T., et al., "On the Performance of c-oriented MFI Zeolite Membranes Treated by Rapid Thermal Processing", "Journal of Membrane Science", 2013, pp. 79-89, vol. 436.

\* cited by examiner (a)

ΔE = 0.0

(b)

ΔE = -1.224

(c)

ΔE = 0.0

(d)

ΔE = -2.221

(a)

ΔE = 0.0

(b)

ΔE = −1.552

(c)

ΔE = 0.0

(d)

ΔE = −2.724

METHOD OF PREPARING DECADODECASIL 3R TYPE ZEOLITE MEMBRANES AND MEMBRANES PREPARED THEREBY

CROSS-REFERENCE TO RELATED APPLICATIONS

This application claims priority under 35 U.S.C. § 119 of Korean Patent Application No. 10-2017-0000680 filed Jan. 3, 2017. The disclosure of such Korean priority patent application is hereby incorporated herein by reference in its entirety, for all purposes.

TECHNICAL FIELD

The present invention relates to a method of preparing a decadodecasil 3R (DDR) type zeolite membrane and a membrane prepared thereby, and more particularly, to a method of preparing a hydrophobic decadodecasil 3R (DDR) type zeolite membrane by adding a substrate on which a seed layer is formed to a silica source synthetic precursor containing a methyltropinium salt and performing a hydrothermal synthesis, and a method of capturing and removing carbon dioxide using a membrane prepared thereby.

BACKGROUND ART

A decadodecasil-3R (DDR) zeolite has an internal pore size of $0.36 \times 0.44$ nm$^2$, such that the DDR zeolites may serve as a molecular sieve through which $CO_2$ having a size of 0.33 nm does not pass but $N_2$ having a slightly larger size of 0.364 nm may pass. However, although existing DDR zeolite membranes reported in documents based on the molecular sieve as described above have high separation performance with respect to a $CO_2/N_2$ mixture, in the case of preparing a DDR zeolite membrane using 1-adamantanamine (ADA) which is well-known structure-directing agent, (SDA) it is difficult to secure high performance. It may be judged that a sufficiently continuous membrane was prepared through scanning electron microscopy, but actually, $CO_2/N_2$ separation performance of the membrane is significantly low. It may be confirmed through experiments that it is very challenging to prepare a DDR zeolite membrane having high performance using the existing structure-directing agent, ADA. However, it is judged that when the DDR zeolite membrane is prepared without defects, it is possible to provide a competitive separation process as compared to other $CO_2$ separation technologies (absorption/adsorption, and the like).

Since DDR zeolite may be prepared in a form in which a Si fraction is high, ingredients thereof are mostly $SiO_2$, thereby exhibiting hydrophobicity. In a case of preparing a membrane using a general hydrophilic zeolite (for example, SAPO-34 (chabazite structure; CHA), NaY (faujasite structure; FAU), or the like), the membrane exhibits high $CO_2/N_2$ separation performance. High $CO_2/N_2$ separation performance is generally resulted from close interaction between $CO_2$ and SAPO-34 having hydrophobicity. However, when moisture is present together with $CO_2/N_2$, $CO_2/N_2$ separation performance may be deteriorated. In order to decrease energy, it is essential to secure technological skills capable of exhibiting high $CO_2/N_2$ separation performance without an additional process for removing moisture even though moisture (at most 10%) is present in flue gas.

In a case of a hydrophilic chabazite type zeolite membrane, $CO_2/N_2$ separation performance under a dry or wet condition and changes in separation performance depending on the presence or absence of moisture may be confirmed in a document (Li, S. G. & Fan, C. Q. High-Flux SAPO-34 Membrane for $CO_2/N_2$ Separation Ind. Eng. Chem. Res., 2010, 49(9), 4399-4404).

Further, in a case of a hydrophilic faujastite (FAU) membrane, $CO_2/N_2$ separation performance under a dry or wet condition and changes in separation performance depending on the presence or absence of moisture may be confirmed in a document (Gu, X. H., et al., Synthesis of Defect-Free FAU-Type zeolite Membranes and Separation for Dry and Moist CO2/N-2 Mixtures Ind. Eng. Chem. Res., 2005, 44(4), 937-944).

A secondary growth method of hydrothermally synthesizing a seed layer using 1-adamantanamine (1-ADA), a conventional organic template, in a method of preparing a DDR zeolite membrane has disclosed in U.S. Patent Application Publication No. 2013/0064747A1. However, the ADA organic template has a problem in that it is significantly difficult to effectively prepare a continuous membrane.

Tomita et al., disclosed a method of preparing a DDR zeolite membrane by hydrothermally synthesizing a seed layer made of DDR zeolite particles using the ADA organic template, similarly in U.S. Patent Application Publication No. 2013/0064747A1 (Tomita et al, Microporous and Mesoporous Materials 68 (2004) 71-75).

Himeno et al. disclosed a method of preparing a DDR zeolite membrane by hydrothermally synthesizing a seed layer made of DDR zeolite particles using the ADA organic template in the same manner as in the above-mentioned documents (Himeno et al., Industrial & Engineering Chemistry Research 46 (2007) 6989-6997).

Meanwhile, up to now, in a post-combustion carbon capturing process using a membrane, a hydrophilic zeolite (for example, NaY zeolite) selectively adsorbing $CO_2$ has been generally used as a material of the membrane. However, since water vapor (at most 10%) is contained in flue gas discharged from coal-fired power plants, $CO_2$ selectivity of the hydrophilic zeolite membrane having high selectivity under a dry condition is significantly decreased under a wet condition. Since water vapor has a molecular size (0.265 nm) smaller than a size (0.33 nm) of $CO_2$, it is impossible to selectively separate only $CO_2$ through the membrane. In this case, it is a wise approach to allow water vapor not to permeate through a membrane as much as possible using a hydrophobic membrane material.

Further, DDR zeolite membranes reported up to now have a random orientation in which a pore structure is not aligned in any one direction, but is randomly aligned in an out-of-plane direction. In this case, there is a problem in that a permeation rate of $CO_2$ passing through the membrane is decreased, such that in a case of treating the same volume, a larger amount of membrane is required as compared to a membrane having a rapid permeation rate.

Therefore, the present inventors tried to solve the above-mentioned problems and confirmed that a continuous membrane in which pore structures in hydrophobic DDR zeolites having a continuous out-of-plane orientation are aligned may be prepared with high reproducibility as compared to an ADA organic template according to the related art by hydrothermally synthesizing a substrate on which a seed layer is formed using a silica source synthetic precursor containing methyltropinium cations, and the above-mentioned hydrophobic DDR zeolite membrane having the out-of-plane orientation exhibited high $CO_2/N_2$ separation performance even in a situation in which moisture is present, thereby completing the present invention.

DISCLOSURE OF INVENTION

An object of the present invention is to provide a method of preparing a membrane in which pore structures in hydrophobic DDR zeolites are aligned with high reproducibility as compared to an ADA organic template according to the related art and which has a continuous out-of-plane orientation, and a membrane prepared thereby.

Another object of the present invention is to provide a method of separating $CO_2$ using the membrane described above.

An aspect of the present invention provides a method of preparing a DDR (decadodecasil 3R) type zeolite membrane comprising: (a) forming a seed layer by depositing DDR type zeolite particles on a porous substrate; and (b) preparing a hydrophobic membrane by adding the substrate on which the seed layer is formed to a silica source synthetic precursor comprising a methyltropinium salt and performing a hydrothermal synthesis.

Another aspect of the present invention provides a DDR type zeolite membrane prepared by the method described above.

An another aspect of the present invention provides a method of separating $CO_2$ from a mixture in which a small molecule selected from the group consisting of $CH_4$, $N_2$, $O_2$, $C_2H_4$, $C_2H_6$, $C_3H_6$ and $C_3H_8$, and $CO_2$ are contained using the DDR type zeolite membrane described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
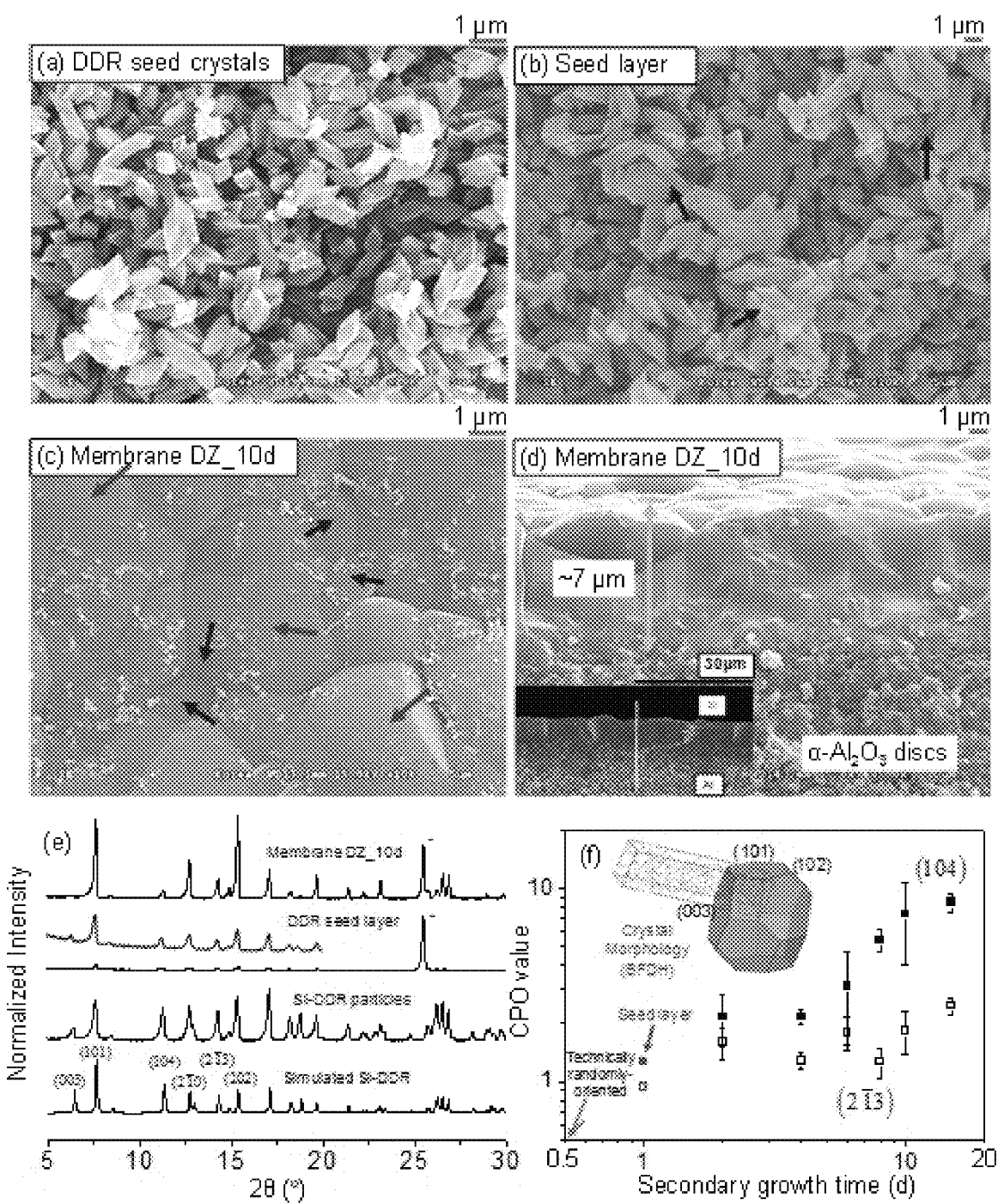
FIG. 1, in panels (a) through (f), shows views illustrating scanning electron microscope (SEM) images of particles obtained by seeded growth according to Example of the present invention.

Unless otherwise defined herein, all of the technical and scientific terms used in the present specification have the same meanings as those understood by specialists skilled in the art to which the present invention pertains. Generally, nomenclature used in the present specification is well known and commonly used in the art.

In the present invention, it may be confirmed that a continuous decadodecasil 3R (DDR) zeolite membrane in which pore structures in DDR zeolites are aligned with high reproducibility as compared to an ADA organic template according to the related art may be prepared by performing a hydrothermal synthesis method using an organic template such as methyltropinium iodide (MTI) including methyltropinium cations, and $CO_2/N_2$, $CO_2/CH_4$, $CO_2$/hydrocarbon mixtures may be efficiently separated using this DDR zeolite membrane.

According to the present invention, when MTI is used in a seeded growth process of preparing a DDR membrane, a specific DDR zeolite crystal plane grows in an out-of-plane direction corresponding to a direction toward a precursor including a synthetic solution, thereby exhibiting an out-of-plane orientation. Further, a hydrophobic DDR zeolite membrane may be prepared with high reproducibility, and particularly, a DDR zeolite membrane having an out-of-plane orientation in which a specific plane is formed in parallel with the membrane and thus the pore structure is aligned in a direction perpendicular to this specific plane may be prepared.

Therefore, in one aspect, the present invention relates to a method of preparing a DDR (decadodecasil 3R) type zeolite membrane comprising: (a) forming a seed layer by depositing DDR type zeolite particles on a porous substrate; and (b) preparing a hydrophobic membrane having a continuous out-of-plane orientation by adding the substrate on which the seed layer is formed to a silica source synthetic precursor comprising a methyltropinium salt and performing a hydrothermal synthesis.

Preferably, the hydrophobic membrane may have an out-of-plane orientation.

The methyltropinium salt may be one or more selected from the group consisting of methyltropinium iodide, methyltropinium fluoride, methyltropinium chloride, methyltropinium bromide, and methyltropinium hydroxide. Preferably, methyltropinium iodide may be used, but the methyltropinium salt is not limited thereto.

In the present invention, the silica source synthetic precursor may be configured so that a molar ratio of $SiO_2$:methyltropinium salt:NaOH:$H_2O$ is 100:1 to 1000:0-1000:10-100000, preferably, 100:10-50:10-60:2000-8000. The molar ratio is in the above-mentioned range, a continuous membrane having the out-of-plane orientation may be prepared.

In the present invention, after step (b), (c) calcining the membrane at 300 to 900° C. for 1 to 240 hours to activate the membrane may be further included. Further, step (b) may be performed at 70 to 250° C. for 1 to 960 hours.

In the present invention, the porous substrate may be made of one or more selected from the group consisting of alumina, polypropylene, polyethylene, polytetrafluoroethylene, polysulfone, polyimide, silica, glass, mullite, zirconia, titania, yttria, ceria, vanadia, silicon, stainless steel, and carbon. Preferably, an alumina, particularly, alpha alumina disc may be used, but it is not limited thereto.

In the present invention, the DDR type zeolite particle in step (a) may be obtained by performing hydrothermal synthesis on DDR particles obtained using a non-seeded growth method at 100 to 200° C. for 1 to 240 hours after adding a synthetic precursor containing ADA, EDA, $SiO_2$, and $H_2O$ at a ratio of 1-100:10-1000:100:100-100000, preferably 1-10:10-500:100:100-5000, and most preferably 9:150:100:4000 (ADA:EDA:$SiO_2$:$H_2O$) thereto.

Further, in the present invention, it was confirmed that a hydrophobic DDR membrane made of a large amount of silica without an aluminum source may be prepared during a hydrothermal synthesis process for secondary growth, and a hydrophobic DDR zeolite membrane having an out-of-plane orientation as described above is not affected by a temperature and pressure of flue gas but may provide and maintain high $CO_2$ separation performance under moisture-containing feed conditions.

Therefore, in another aspect, the present invention relates to a DDR type zeolite membrane prepared by the method described.

In another aspect, the present invention relates to a method of separating $CO_2$ from a mixture in which a small molecule selected from the group consisting of $CH_4$, $N_2$, $O_2$, $C_2H_4$, $C_2H_6$, $C_3H_6$, and $C_3H_8$ and $CO_2$ are contained using the DDR type zeolite membrane described above.

Separation factors of the hydrophobic DDR zeolite membrane having an out-of-plane orientation according to the present invention for 50% $CO_2$:50% $N_2$ (moisture-free conditions) at 0° C., 50° C., and 75° C. were about 13.2, 11.9, and 10.4, respectively. However, the separator factors were rather increased to 14.4, 15.9, and 12.7 at all of the temperatures under wet conditions. Particularly, considering that a temperature of the flue gas is 50 to 75° C., it may be confirmed that high separation performance is exhibited even under the wet conditions. An entire pressure of the flue gas is about 1 atm, wherein a partial pressure of $CO_2$ is about 10 to 14%, and under conditions of 15% $CO_2$:85% $N_2$ as well as 50% $CO_2$:50% $N_2$, almost equal $CO_2/N_2$ separation performance was exhibited.

Hereinafter, the present invention will be described in detail through the Examples. However, these Examples are only to illustrate the present invention, and those skilled in the art will appreciate that these Examples are not to be construed as limiting a scope of the present invention.

EXAMPLE

Preparation Example 1: Synthesis of DDR Zeolite Particles Having a Uniform Size of 1 μm or Less Using Seeded Growth First, DDR zeolite particles having irregular shapes and wide size distribution were synthesized using a conventional non-seeded growth method. The DDR zeolite particles obtained as described above were used as seeds, thereby DDR zeolites having a uniform size of 3 μm was synthesized.

After adamantylamine (ADA, 97%, Sigma-Aldrich) was added to ethylenediamine (EDA, 98%, Sigma-Aldrich) and mixed with each other using a shaker for about 1 hour, additional sonication was performed thereon for about 1 hour. The solution prepared as described above was added to deionized water and CAB-O-SIL (cabot corporation, M5 grade) used as a silica source was added thereto. The synthetic precursor prepared as described above was added to silicon oil bath heated to about 95° C. and stirred for about 1 hour. A composition of the synthetic precursor was 9 ADA:150 EDA:100 $SiO_2$:4,000 $H_2O$. About 0.1 g of DDR particles obtained by non-seeded growth was added to about 30 g of the synthetic precursor prepared as described above. Thereafter, hydrothermal synthesis was performed at 160 for 4 days, followed by vacuum filtration, thereby synthesizing DDR zeolite particles. The DDR zeolite particles having a size of 3 μm, obtained as described above, were additionally subjected to seeded growth, thereby obtaining DDR zeolite particles having a size of 820 nm. More specifically, first, the DDR particles having a size of 3 μm was ball-milled at 300 rpm for 12 hours, thereby decreasing the size of the DDR particles. A suspension was prepared by adding about 1 g of the ball-milled DDR particles to 1 L of deionized water. At the same time, the synthetic precursor obtained by mixing ADA, AS-30 (LUDOX® AS-30 colloidal silica; 30 wt % suspension in $H_2O$, Sigma-Aldrich) corresponding to a silica source, EDA, and water with one another was prepared. Here, a molar composition ratio was 6:100:50:10,000. About 10 g of the prepared suspension was added to about 20 g of the precursor prepared as described above. Thereafter, the DDR zeolite particles having a size of about 820 nm were synthesized through hydrothermal synthesis at 160° C. for 4 days.

Example 1: Synthesis of Hydrophobic DDR Zeolite Membrane Having Out-of-Plane Orientation Using Methyltropinium Cation The DDR zeolite particles obtained in Preparation Example 1 were deposited on a porous alpha alumina disc. A simple dip-coating method was used for deposition. Specifically, about 0.05 g of sintered DDR zeolite particles were added to 40 mL of ethanol, thereby preparing a coating dispersion. Next, after the coating dispersion prepared as described above was brought in contact with a polished side of an α-alumina disc for about 30 seconds, the disc was taken out (slipped aside) and allowed to dry for 30 seconds. This process was repeated about 4 times, thereby inducing DDR zeolite particles in the dispersion to be attached onto a surface of the alumina disc. The alpha alumina disc including a DDR zeolite seed layer formed thereon, obtained as described above was put into the synthetic precursor containing methyltropinium iodide (MTI) and hydrothermal synthesis was performed, thereby synthesizing the hydrophobic DDR zeolite membrane having a continuous out-of-plane orientation. Specifically, LUDOX HS-40 (40 wt % suspension in $H_2O$, Sigma-Aldrich) serving a silica source and methyltropinium iodide (MTI) were added together to deionized (DI) water. The precursor prepared as described above was mixed for about 1 hour using a shaker. After additionally adding NaOH, the mixture was well mixed overnight using the shaker. A molar composition of the synthetic precursor prepared as described above was 100 $SiO_2$:25MTI:30 NaOH:4000 $H_2O$. After the alpha alumina disc including the seed layer formed thereon was put into the precursor prepared as described above, continuous DDR zeolite membranes were prepared by performing hydrothermal synthesis at 130° C. while changing a time (2, 4, 6, 8, 10, and 15 days). The synthesized membrane was thermally activated by sintering at 550° C. for about 12 hours.

The resulting membrane was referred to as DZ_xd (here, D indicates the DDR seed layer, Z represents synthesis of ZSM-58 adopted for the secondary growth, and x stands for the varied hydrothermal reaction time in d: 2, 4, 6, 8, 10, and 15). Although ZSM-58 particles themselves are not appropriate for constituting a uniform seed layer, a synthetic route toward ZSM-58 was adopted to inter-grow a Si-DDR seed layer toward the continuous Si-DDR film.

Analysis of Membrane Characteristics

Scanning electron microscopy (SEM) images were acquired with a Hitachi S-4300 instrument. Surfaces of all samples were Pt-sputtered prior to imaging. In addition, X-ray diffraction (XRD) patterns were obtained using a Rigaku Model D/Max-2500V/PC diffractometer (Japan) with Cu $K_\alpha$ radiation ($\lambda$=0.154 nm). A crystallographic information file (CIF), downloaded from the International Zeolite Association (IZA), was processed to acquire the simulated XRD pattern of all-silica DDR zeolites. For processing, the Mercury software (available from the Cambridge Crystallographic Data Centre; CCDC) was used. Crystallographic preferential orientation (CPO) values of the (101) plane were calculated by using the following formula:

$$CPO_{(101)/x} = [I_{(101)}/I_x|_M - I_{(101)}/I_x|_P]/(I_{(101)}/I_x|_P)$$

where, P and M indicate DDR powder and membrane, respectively.

In order to quantify the degree of the h0h-out-of plane orientation of the DDR membranes, the XRD intensities of the (101) reflections were compared with those of ($2\bar{1}3$) and (104) reflections, which served as references (here indicated by the placeholder x). Fluorescence confocal optical microscopy (FCOM) images of the dye-saturated DDR membranes were obtained by using a Carl Zeiss LSM 700 confocal microscope equipped with a solid state laser (wavelength: 555 nm). The DDR membranes were impregnated with fluorescent dye molecules using "osmosis-type" module (T. Lee et al., *J. Membr Sci.*, 2013, 436, 79-89).

The membrane side (i.e., α-$Al_2O_3$ disc top) was contacted with 1 mM fluorescein sodium solution (Sigma-Aldrich), while the opposite side (i.e., α-$Al_2O_3$ disc bottom), was contacted with deionized water. Dyeing was performed for about 4 days. A size of fluorescein molecules (~0.9 nm) is smaller than that of intercrystalline defects, but larger than that of DDR zeolitic pores (~0.4 nm), allowing for the selective dyeing of defects.

The $CO_2/N_2$ separation performance of the DDR membranes was measured using the custom-made permeation system described in a previous study (E. Kim et al., *Environ. Sci. Technol.*, 2014, 48, 14828-14836). The Wicke-Kallenbach mode was used; both the feed and permeate sides were maintained at a total pressure of ~1 atm. The partial pressures of $CO_2$ and $N_2$ in the feed side under the dry condition were 50.5 kPa and 50.5 kPa, respectively, (referred to as 50:50 DRY), while those of $CO_2$, $N_2$, and $H_2O$ under the wet condition were 49 kPa, 49 kPa, and 3 kPa, respectively (50:50 WET). In addition, simulated flue-gas mixtures, composed of 15.2 kPa $CO_2$ and 85.9 kPa $N_2$ (referred to as 15:85 DRY) and 14.7 kPa $CO_2$, 83.3 kPa $N_2$, and 3 kPa $H_2O$ (referred to as 15:85 WET) were used as feed. In summary, a total flow rate of ~100 mL·$min^{-1}$ was used to provide the feed mixture and the helium flow rate of ~100 mL·$min^{-1}$ was used for sweeping. The permeating species on the permeate side was further sent to a gas chromatograph (YL 6100 GC, YOUNG LIN, South Korea) equipped with a packed column (6 ft×⅛" Propak T) and a thermal conductivity detector (TCD) for on-line analysis. For reliable analyses, $CH_4$ was added to the permeate flow for use as the internal standard.

DDR Membrane Having Orientation and Hydrophobicity

Figure 8:
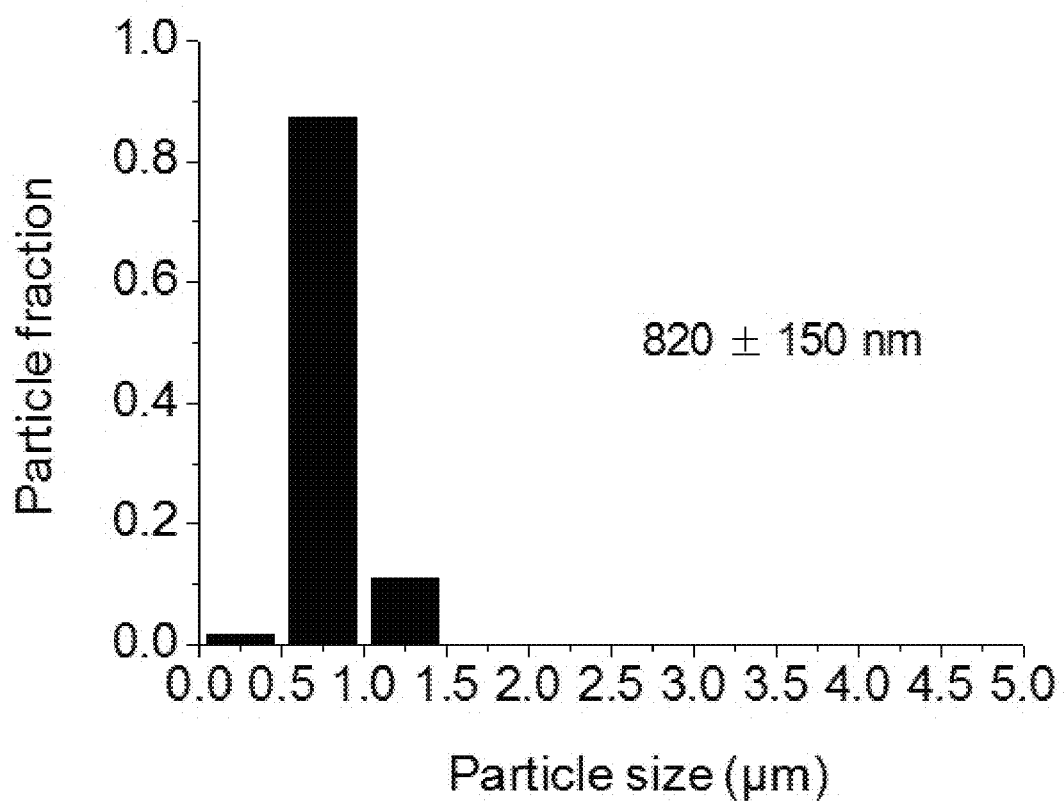
FIG. 8 is a view illustrating size distribution of particles illustrated in FIG. 1, panels (a) through (f).

FIG. 1, panel (a) illustrates seeded growth of diamond-like particles, which were similar to conventional diamond-like Si-DDR particles (E. Kim et al., *Chem. Commun.*, 2013, 49, 7418-7420; J. Gascon et al., *Micropor. Mesopor. Mater.*, 2008, 115, 585-593). A noticeable feature of these particles was a high mono-dispersity with an estimated size of ~820±150 nm (FIG. 8). FIG. 8 is a view illustrating size distribution of the particles illustrated in FIG. 1, panel (a). A particle size was measured in a base surface such as diamond in a longest direction, and an average size and standard deviation were provided.

FIG. 1, panel (a) illustrates particles obtained by seeded growth and FIG. 1, panel (b) is a SEM Image of a seed layer composed of the particles illustrated in FIG. 1, panel (a). Further, FIG. 1, panels (c) and (d) are top and cross-sectional view SEM image of a membrane (membrane DZ_10d)) inter-grown from the seed layer illustrated in FIG. 1, panel (b) along with EDX results. FIG. 1, panel (e) illustrates XRD patterns of the particles, the seed layer, and membrane DZ_10d shown in FIG. 1, panels (a) to (c), respectively, along with the simulated XRD pattern of Si-DDR zeolites, and the asterisk (*) indicates a peak from an α-$Al_2O_3$ disc. FIG. 1, panel (f) illustrates CPO values of membranes DZ_xd (x=2, 4, 6, 8, 10, and 15) based on the comparison of a (101) plane with (filled) and (open) planes. The crystal morphology of a DDR particle generated using the Bravais, Friedel, Donnay, and Harker (BFDH) method is included in the inset.

Figure 9:
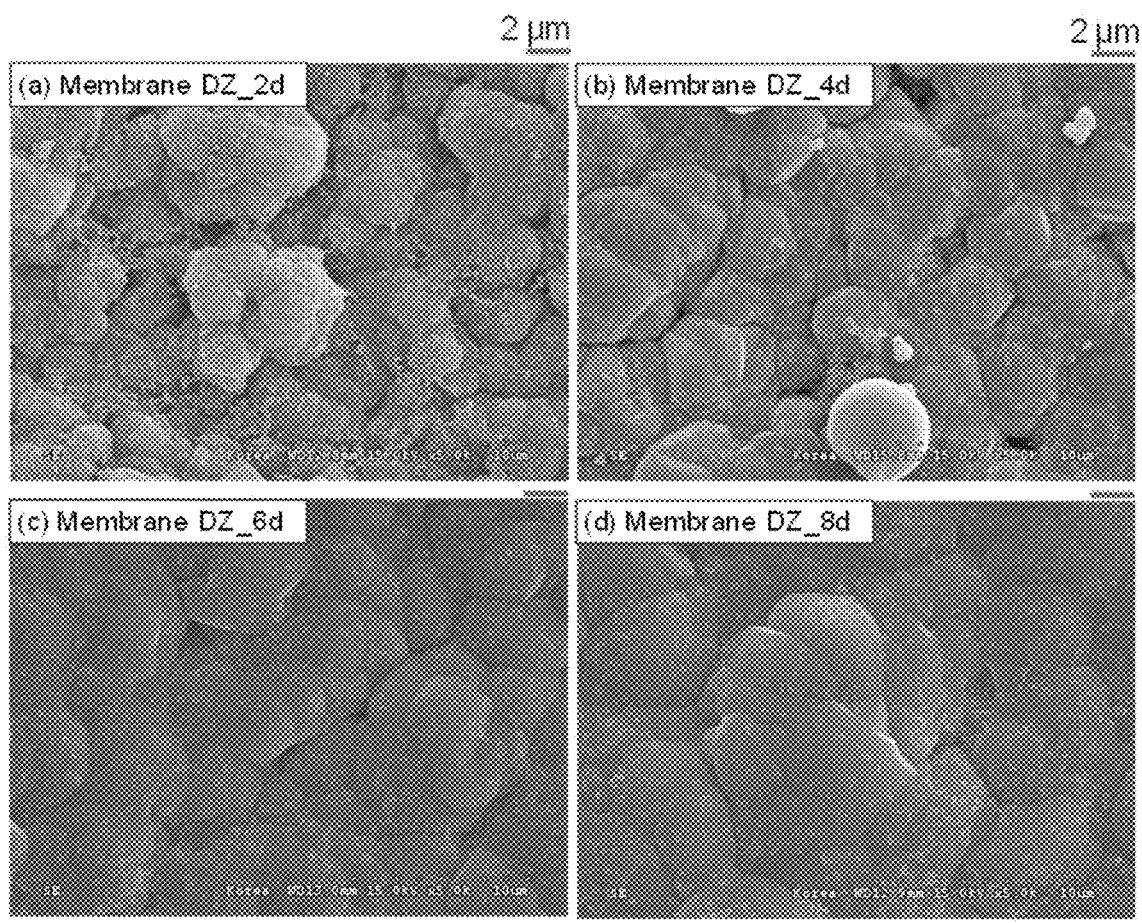
FIG. 9, in panels (a) through (d), shows cross-sectional SEM images of membranes according to Example of the present invention.

This sub-micron size is suitable for forming a uniform layer, which is a pre-requisite for successful secondary growth (E. Kim et al., J. Choi, *Chem. Commun.*, 2013, 49, 7418-7420). These diamond-like particles were deposited on the surface of a porous α-$Al_2O_3$ disc. These particles were integrated in the formation of a multi-layer (blue arrows in FIG. 1, panel (b)), though some empty spaces co-existed (red arrows in FIG. 1, panel (b)). Subsequent seeded growth for 10 days resulted in a continuous film (FIG. 1, panel (c)) and its thickness was ~7 μm (FIG. 1, panel (d)). The multi-layered and empty spaces may be associated with the smaller (blue arrows in FIG. 1, panel (c)) and larger (red arrows in FIG. 1, panel (c)) grains in the membrane DZ_10d, respectively. Membranes grown after the shorter secondary growth durations (2, 4, 6, and 8 days) are also illustrated in FIG. 9, panels (a) through (d). FIG. 9, panels (a), (b), (c), and (d) are cross-sectional view SEM images of membranes DZ_2d, DZ_4d, DZ_6d, and DZ_8d, respectively. All scale bars represent 2 μm. With the increase in secondary growth time, a discontinuous membrane (membrane DZ_2d) was gradually converted into a well-inter grown, continuous membrane (membranes DZ_6d and _8d) through an intermediate stage (membrane DZ_4d).

Figure 10:
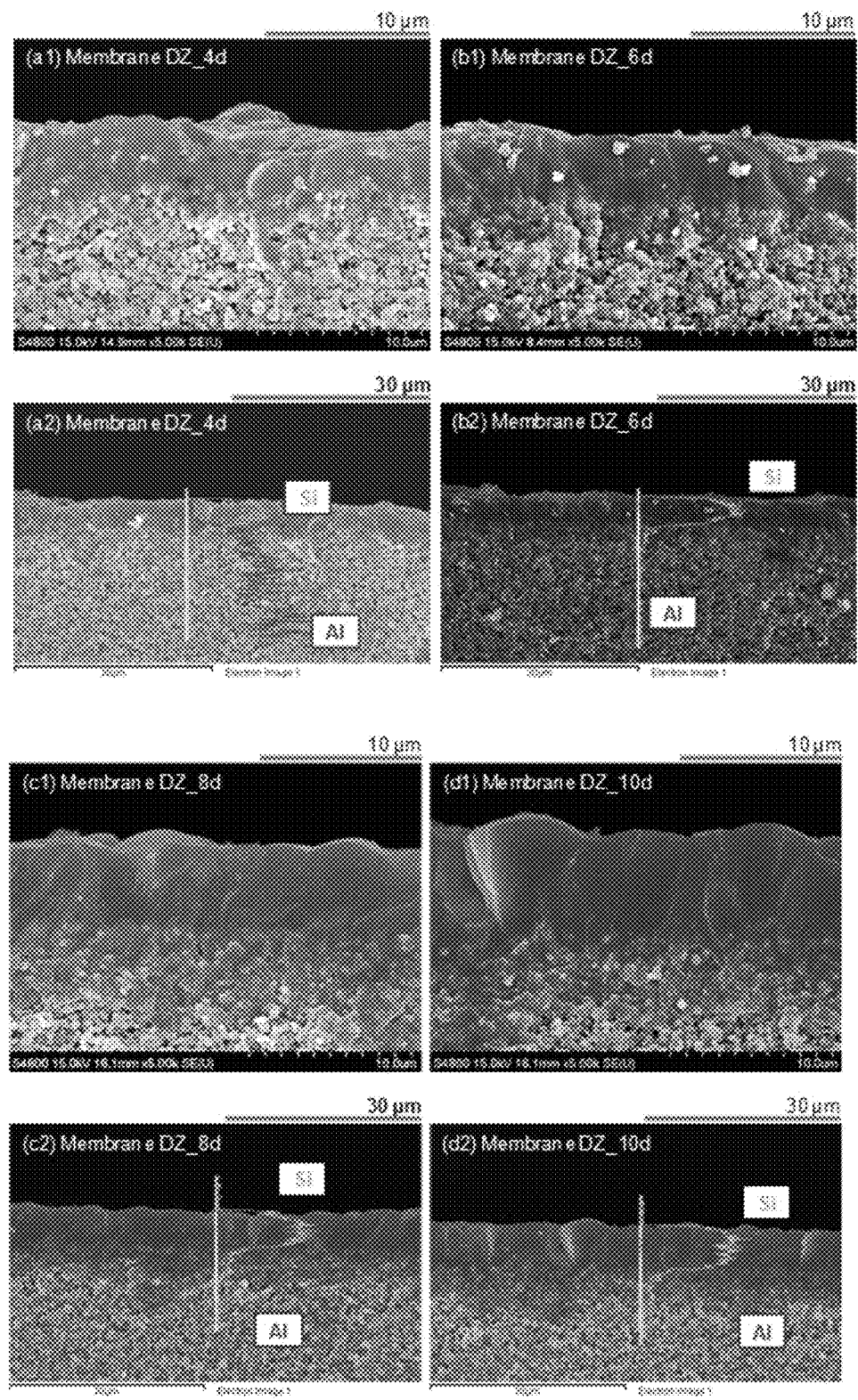
FIG. 10, in panels (a1) through (d2), shows views illustrating cross-sectional SEM images and EDX results of the membranes according to Example of the present invention.

FIG. 10, panels (a1) to (d2) are views illustrating cross-sectional SEM images (top) and EDX results (bottom) of a membrane DZ_4d (FIG. 10, panels (a1) and (a2)), a membrane DZ_6d (FIG. 10, panels (b1) and (b2)), a membrane DZ_8d (FIG. 10, panels (c1) and (c2)), and a membrane DZ_10d (FIG. 10, panels (d1) and (d2)).

As illustrated in the inset of FIG. 1, panel (d) and FIG. 10, panels (a1) through (d2), all membranes were Si-dominant and had a rapid decrease down to the zero Si loading near an interface between the membrane and the disc. Note that the chemical composition trend was typical of a highly siliceous zeolite membrane (J. Choi et al., *Science*, 2009, 325, 590-593), and hydrophobicity tended to be decreased.

Figure 11:
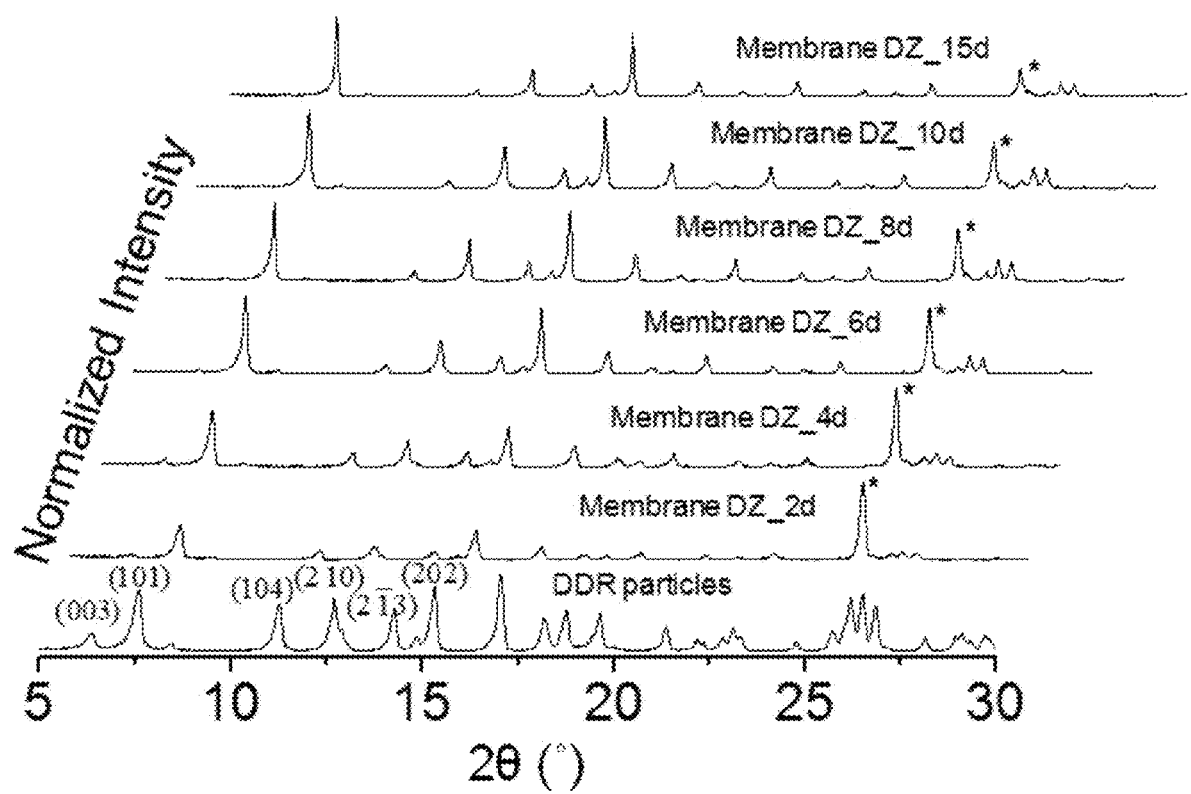
FIG. 11 is a view illustrating XRD patterns of membranes according to Example of the present invention.

The XRD analysis in FIG. 1, panel (e) confirms that the diamond-like particles in FIG. 1, panel (a) possessed a pure DDR phase with an apparent all-silica composition. The Si-DDR seed layer in FIG. 1, panel (b) achieved some degree of an h0h-out-of-plane orientation, though it was hardly expected because of the observation of aggregated multi-layers. All membranes synthesized in the present invention were primarily comprised of the DDR phase (FIG. 11). FIG. 11 shows views illustrating XRD patterns of the membranes DZ_xd (x=2, 4, 6, 8, 10, and 15). Further, the XRD pattern of Si-DDR particles is added as a reference and the asterisks (*) indicate the XRD peaks of the α-$Al_2O_3$ disc. Among them, the membrane DZ_10d showed apparently pronounced h0h-out-of-plane orientation, due to the preferential growth in the out-of-plane direction after secondary growth (FIG. 1, panel (e) and FIG. 11). Considering the preferred growth in the out-of-plane direction during secondary growth (A. Gouzinis, M. Tsapatsis, *Chem. Mater.*, 1998, 10, 2497-2504), the fastest crystal growth observed in hexagonal prism-shaped ZSM-58 in a direction perpendicular to the (101) or (10$\bar{2}$) plane, predictable from the crystal morphology (inset of FIG. 1, panel (f)), would allow for achieving a certain out-of-plane orientation.

It was predicted that h0h-orientation in the seed layer will facilitate the selective growth toward the (101) plane, thus resulting in forming h0h-oriented Si-DDR films. On the contrary, the use of ADA during the secondary growth of even highly h0h-oriented Si-DDR layers inevitably resulted in forming randomly oriented DDR films (E. Kim et al., *Chem. Commun.*, 2013, 49, 7418-7420). The h0h-oriented Si-DDR films are desirable for securing a high flux through the membrane, with a tortuosity of ~1.2 across the membrane with respect to the 8-MR channel along an a- or b-axis. In order to quantify the degree of out-of-plane orientation, the crystallographic preferential orientation (CPO) indexes of DZ membrane series, for which the ratio of the XRD intensity of the (101) plane to that of the (104) or (2$\bar{1}$3) plane was considered, were measured (FIG. 1, panel (f)). As the secondary growth time was increased, the degree of h0h-out-of-plane orientation was also increased. Taken together with the chemical composition and out-of-plane orientation, MTI served as an effective SDA, and consequently, it was possible to prepare the h0h-oriented, siliceous DDR membrane.

$CO_2/N_2$ Separation Performance of DDR Membrane

Figure 2:
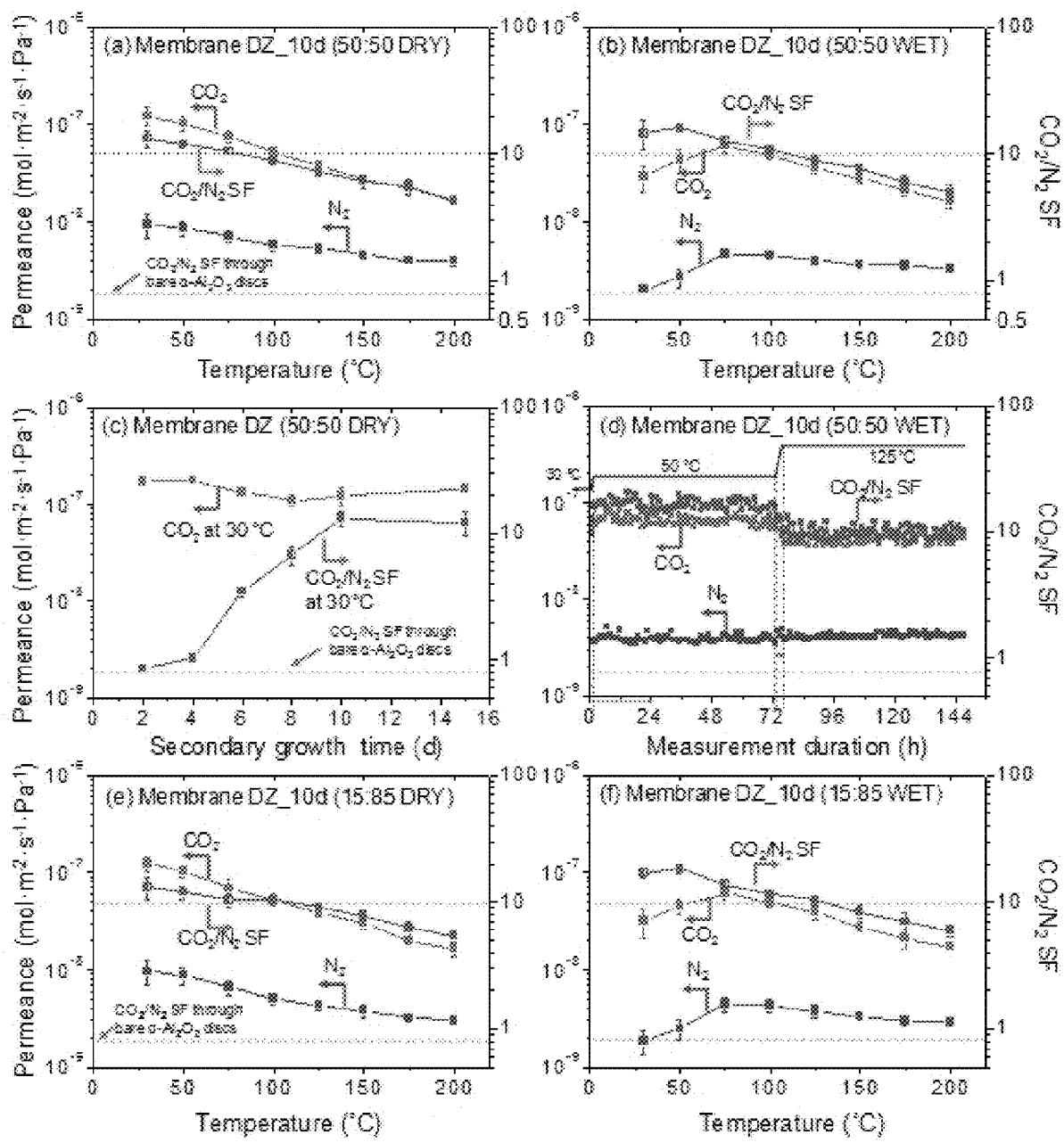
FIG. 2, in panels (a) through (f), shows views illustrating $CO_2/N_2$ permeances of membranes according to Example of the present invention.
Figure 12:
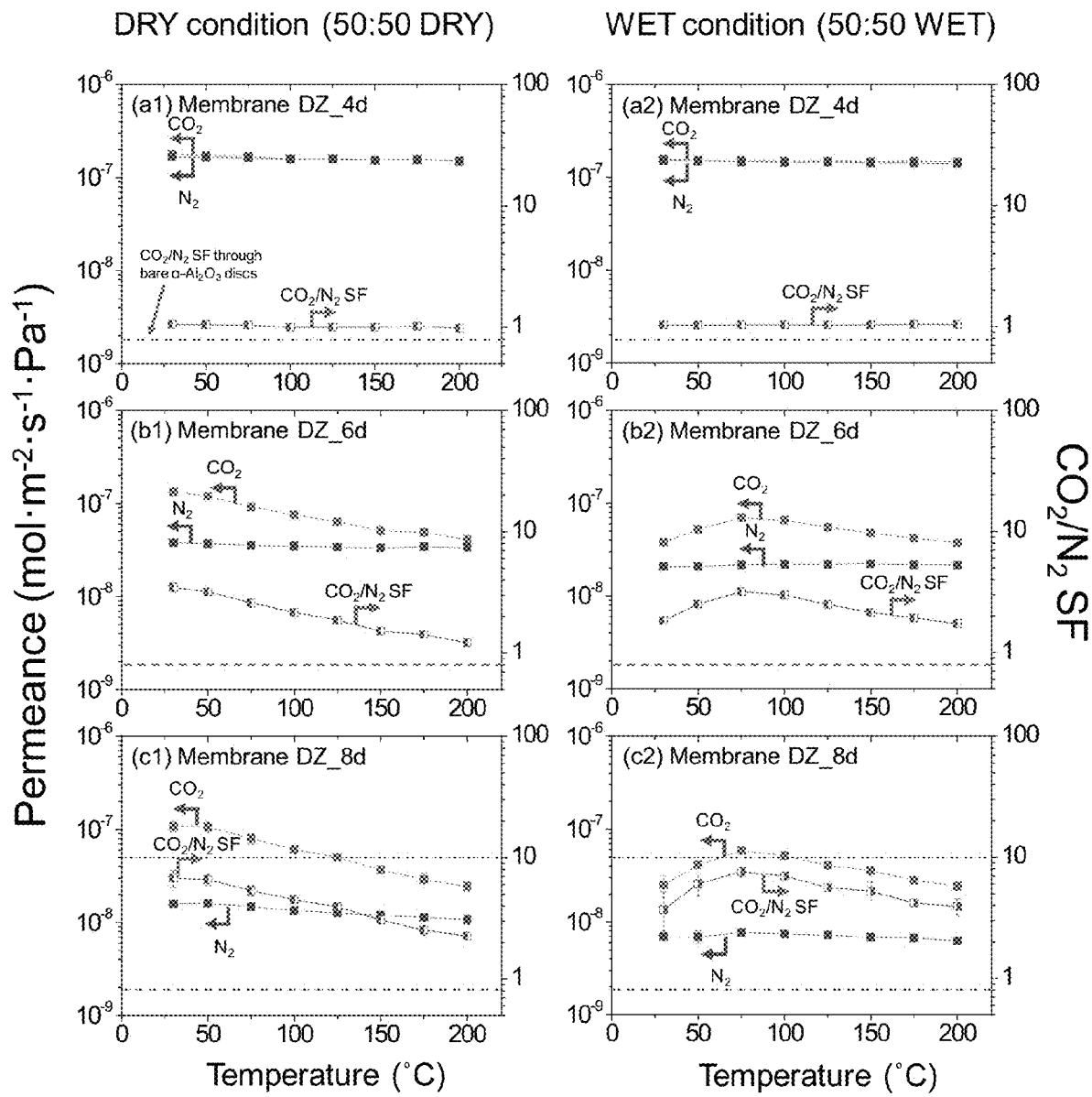
FIG. 12, in panels (a1) through (c2), shows views illustrating permeances of $CO_2$ and $N_2$ and their corresponding $CO_2/N_2$ SFs through membranes as a function of temperature under dry and wet conditions according to Example of the present invention.

As the secondary growth time was increased, the corresponding $CO_2/N_2$ SFs were not decreased but were increased under both dry and wet conditions (FIG. 12, panels (a1) through (c2), and FIG. 2, panels (a) and (b)). All membranes showed a monotonic decrease in $CO_2/N_2$ SF under the dry condition with increasing temperature, which is acceptable under the sorption-based separation protocol.

FIG. 2, panels (a), (b), (e) and (f) are graphs illustrating permeances of $CO_2$ and $N_2$ and the corresponding $CO_2/N_2$ SFs through the membrane DZ_10d as a function of temperature: under dry (50:50 DRY (FIG. 2, panel (a)) and 15:85 DRY (FIG. 2, panel (e)) conditions and wet (50:50 WET (FIG. 2, panel (b)) and 15:85 WET (FIG. 2, panel (f)) conditions.

FIG. 2, panel (c) is a graph illustrating $CO_2$ permeances and $CO_2/N_2$ SFs through membranes DZ_xd (x=2, 4, 6, 8, 10, and 15) at 30° C. under the dry condition (50:50 DRY), and FIG. 2, panel (d) is a graph illustrating $CO_2/N_2$ separation performance depending on measurement time at 50° C. where the max $CO_2/N_2$ SF of the membrane DZ-10 confirmed in FIG. 2, panel (b) was observed, and illustrating the highest temperature for obtaining a $CO_2/N_2$ SF close to ~10. In all graphs, the blue dashed lines indicate the $CO_2/N_2$ SF through a bare α-$Al_2O_3$ disc, while the red dashed lines represent a $CO_2/N_2$ SF of ~10, approximated from the product of the adsorption and diffusion selectivities.

Further, FIG. 12, panels (a1) through (c2), shows views illustrating permeances of $CO_2$ and $N_2$ and their corresponding $CO_2/N_2$ SFs (maximum temperature: 200° C.) through membranes DZ_4d (FIG. 12, panels (a1) and (a2)), DZ (FIG. 12, panels (b1) and (b2)), and DZ_8d (FIG. 12, panels (c1) and (c2)) under the dry (50:50 DRY) and wet (50:50 WET) conditions. The $CO_2/N_2$ SF (the blue dashed line) through a bare α-$Al_2O_3$ disc and the $CO_2/N_2$ SF of 10 (the red dashed line) of FIG. 12, panels (c1) and (c2) were used for comparison.

Among them, the membrane DZ_10d, which had the highest degree of the h0h-out-of-plane orientation (FIG. 1, panel (f)), showed $CO_2/N_2$ separation performance with a max $CO_2/N_2$ SF of ~13.2±1.8 at 30° C. under the dry condition (FIG. 2, panel (a)). The max $CO_2/N_2$ SFs are displayed as a function of the secondary growth time of up to 15 days (FIG. 2, panel (c)). Considering that the $CO_2/N_2$ SF through a bare α-$Al_2O_3$ disc is ~0.8 as determined by Knudsen diffusion, the intrinsic $CO_2/N_2$ SF through the membrane DZ_10d will be as high as ~16.4, which is slightly smaller than the ideal permeation selectivity of ~20 at 300 K estimated from molecular simulations (R. Krishna et al., *J. Membr. Sci.*, 2010, 360, 323-333). This result indicates that there is still a room to improve the $CO_2/N_2$ separation performances of DDR membranes.

The membrane DZ_10d also showed good $CO_2/N_2$ separation performance under the wet condition (FIG. 2, panel (b)). Unlike the monotonic decrease in $CO_2/N_2$ SF as a function of temperature under the dry condition, the membrane DZ_10d showed a max $CO_2/N_2$ SF of ~15.9±1.1 at 50° C. More importantly, the membrane DZ_10d exhibited $CO_2/N_2$ SFs higher than 10 in a temperature range of 30 to 100° C. The $CO_2$ permeances (molar fluxes normalized by the pressure drop across a membrane) at 30 to 75° C. through the membrane DZ_10d under the wet condition were smaller than those under the dry condition; this difference is apparently due to the $CO_2$ permeation being hindered by the adsorbed $H_2O$. On the other hand, the permeance of the slightly larger $N_2$ molecules was further decreased under the wet condition, thus resulting in an increase in the $CO_2/N_2$ SF; $CO_2/N_2$ SFs of 13.2, 11.9, and 10.4 at 30, 50, and 75° C. under the dry condition increased to 14.4, 15.9, and 12.7, respectively, under the wet condition. Particularly, the $CO_2/N_2$ separation performance of the membrane DZ_10d was significantly insensitive to temperature (FIG. 2, panel (b)) and thus, it is attractive for practical uses in a wide temperature range of 30 to 125° C. In addition, the permeation test of the membrane DZ_10d under the wet condition supported its robustness for long-term applications (FIG. 2, panel (d)). In addition to the 50% $CO_2/50\%$ $N_2$ compositions (H. Kalipcilar et al., Chem. Mater., 2002, 14, 3458-3464; K. Kusakabe et al., Ind. Eng. Chem. Res., 1997, 36, 649-655; frequently adopted for zeolite membrane assessment), simulated flue-gas (15% $CO_2/85\%$ N2; T. M. McDonald et al., J. Am. Chem. Soc., 2012, 134, 7056-7065; M. Mavroudi et al., Fuel, 2003, 82, 2153-2159: 85 DRY and 15:85 WET) were used to evaluate the separation performance of membrane DZ_10d. The resulting $CO_2/N_2$ separation performances under the dry and wet conditions (FIG. 2, panels (e) and (f), respectively) were almost identical to those shown in FIG. 2, panels (a) and (b), respectively, as expected from the almost linear adsorption behaviors of $CO_2$ and $N_2$ in Si-DDR zeolites (E. Kim et al., Chem. Eng. J., 2016, 306, 876-888). This implies a linear response of membrane DZ_10d for the molar fluxes with respect to varying feed pressures. Such temperature- and pressure-insensitive $CO_2/N_2$ separation performances indicate that the membrane DZ_10d is significantly effective for capturing carbon. In addition, the linear response is beneficial for maintaining a similar permeation performance at any level of stage cut. FIG. 12, panels (a2) through (c2), also show the increasing trend of $CO_2/N_2$ SFs under the wet condition for membranes DZ_6d and DZ_8d, though any improvement in the $CO_2/N_2$ SF was not observed in membrane DZ_4d, which likely had a high number of defects.

Characterization of Defects in DDR Membranes

Figure 3:
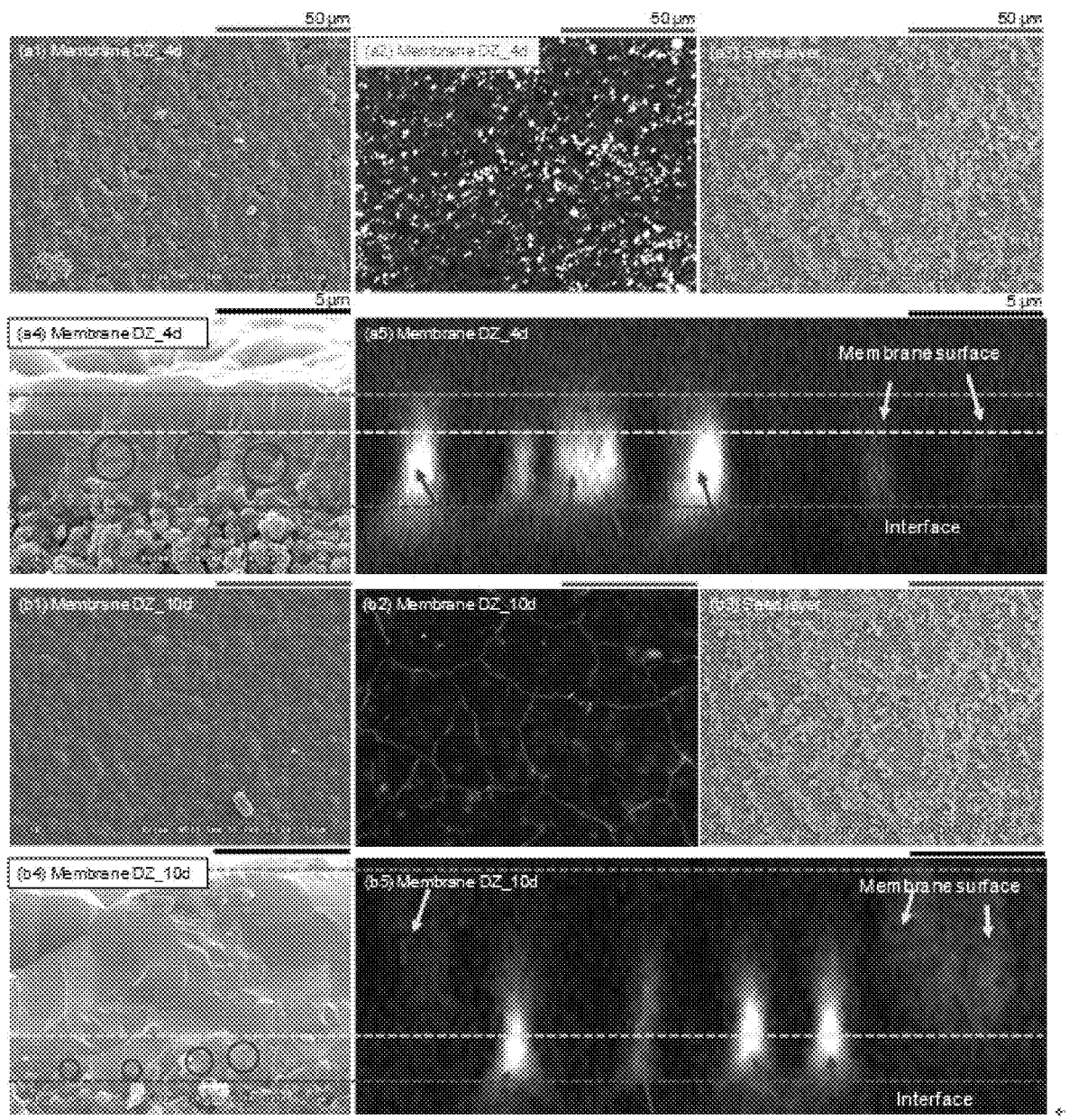
FIG. 3, in panels (a1) through (b5), shows top and cross-sectional view FCOM and SEM images of membranes according to Example of the present invention.

Recognizing the comparatively superior $CO_2/N_2$ separation performance of membrane DZ_10d, its defective structure was analyzed in order to understand how the high separation performance occurred. In particular, the defective structure along the membrane thickness was visualized by using FCOM characterizations (G. Bonilla et al., J. Membr. Sci., 2001, 182, 103-109). FIG. 3, panels (a1) through (b5), shows top-view and cross-sectional-view FCOM and SEM images of membranes DZ_4d (chosen as a reference due to its poor separation performance; FIG. 12, panels (a1) through (c2)) and DZ_10d along with the SEM images of the DDR seed layer. FIG. 3, panels (a1), (b1), (a2), and (b2) are SEM images (cross-sectional views) and FCOM images near surfaces of the membranes DZ_4d and DZ_10d, respectively, and FIG. 3, panels (a3) and (b3), show SEM images of the DDR seed layer illustrated in FIG. 1, panel (b) at a lower magnification. FIG. 3, panels (a4) and (b4) are cross-sectional-view SEM images of the membranes DZ_4d and DZ_10d and FIG. 3, panels (a5) and (b5), are FCOM images of the membranes DZ_4d and DZ_10d, respectively. Here, the blue and red dashed lines indicate the membrane surface and interface, respectively, while a yellow dashed line indicates the position below which cavities are present. The cavities observed in FIG. 3, panels (a4) and (b4), are marked by red circles. The yellow and red arrows point to the cracks (propagating down to the interface) cavities (mainly present below the yellow dashed lines), respectively.

Figure 13:
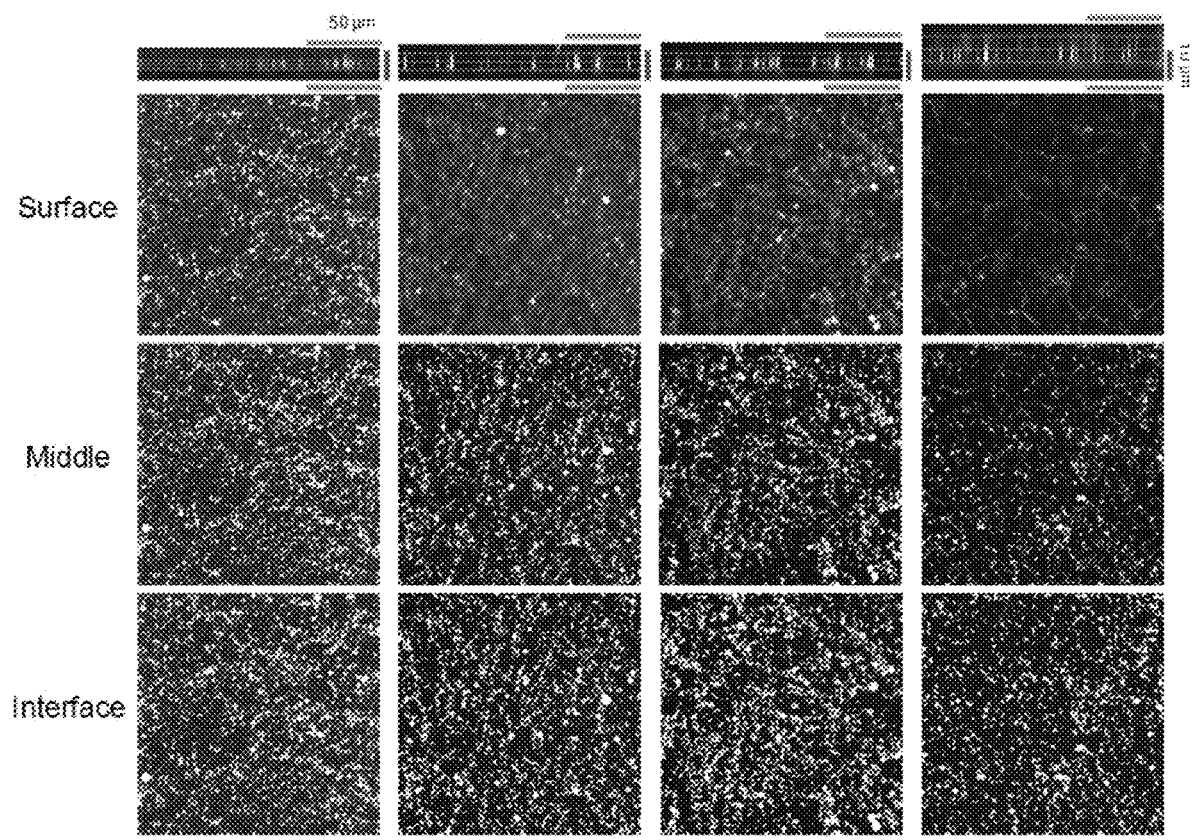
FIG. 13 is a view illustrating cross-sectional view FCOM images of membranes according to Example of the present invention.
Figure 14:
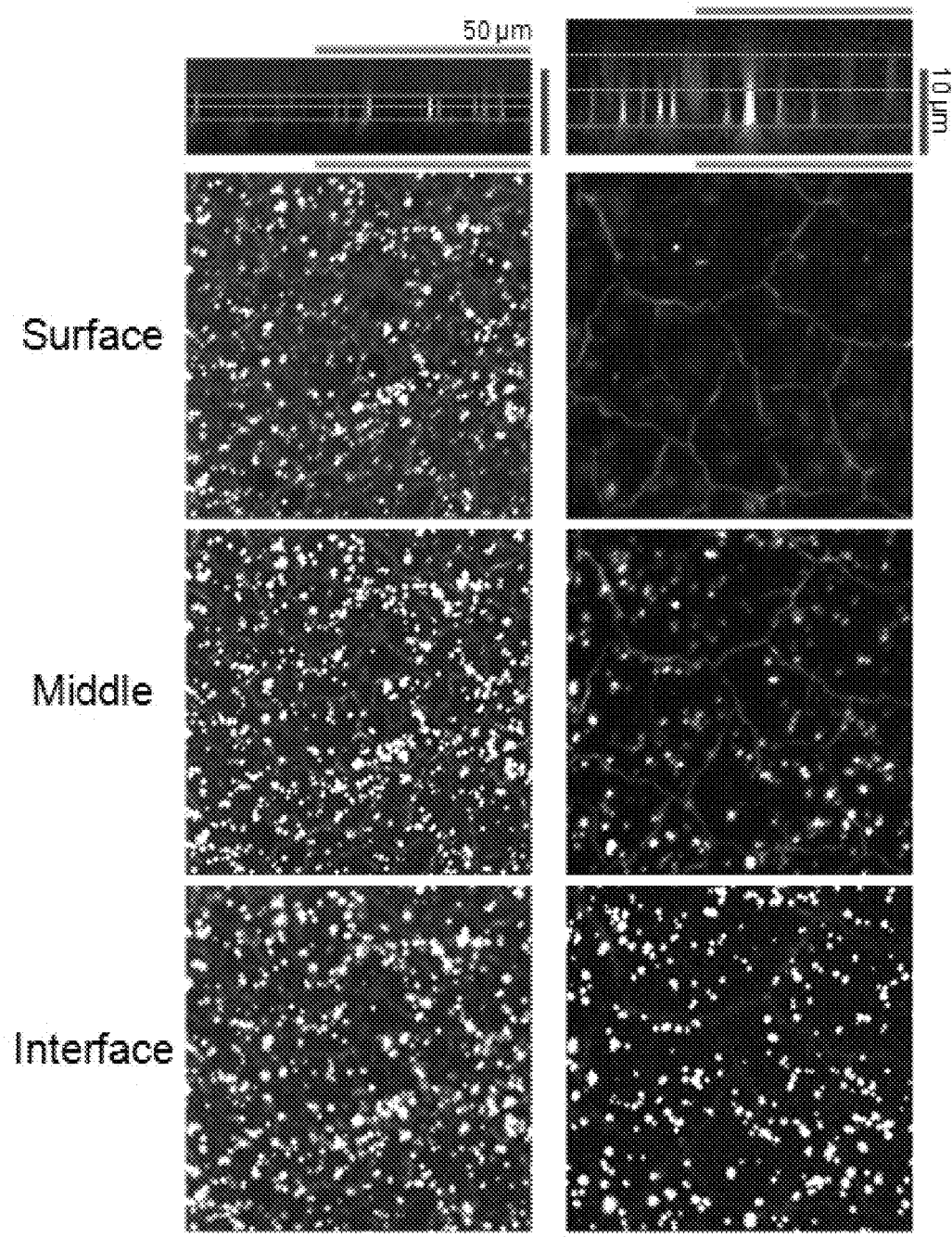
FIG. 14 is a view illustrating high-resolution (cross-sectional and top view) FCOM images of membranes according to Example of the present invention.

There are a lot of lines formed by bright spots in both top-view and cross-sectional-view images of the membrane DZ-4d, which indicates that a lot of defects, easily accessible by dye molecules, exist in membrane (FIG. 8, FIG. 13, and FIG. 14).

FIG. 13 illustrates cross-sectional view FCOM images obtained from membranes DZ_4d ($1^{st}$ column), DZ_6d ($2^{nd}$ column), DZ_8d ($3^{rd}$ column), and DZ_10d ($4^{th}$ column), and FIG. 14 illustrates cross-sectional and top view FCOM images of membranes DZ_4d (left) and DZ_10d (right) at a higher magnification, as compared with those in FIG. 13. For the top-view FCOM images ($2^{nd}$-$4^{th}$ rows), the positions where the FCOM images were obtained are designated in the corresponding cross-sectional-view FCOM images ($1^{st}$ row).

Figure 15:
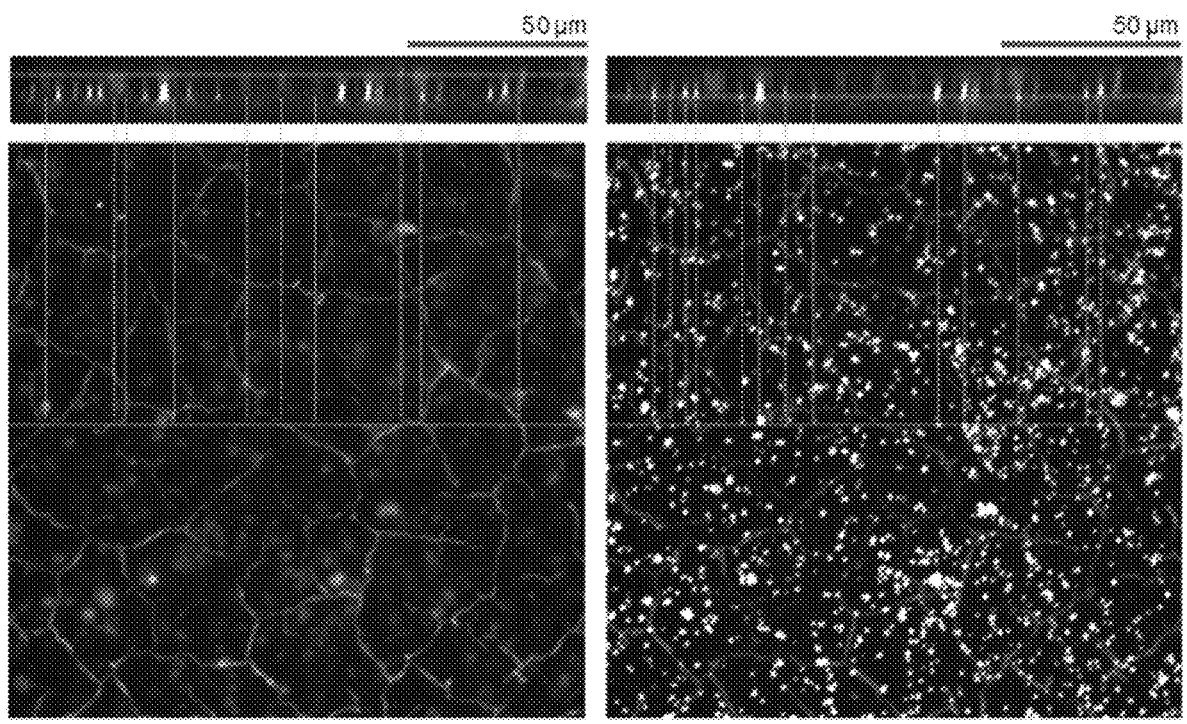
FIG. 15 is a cross-sectional view FCOM image of a membrane according to Example of the present invention.
Figure 16:
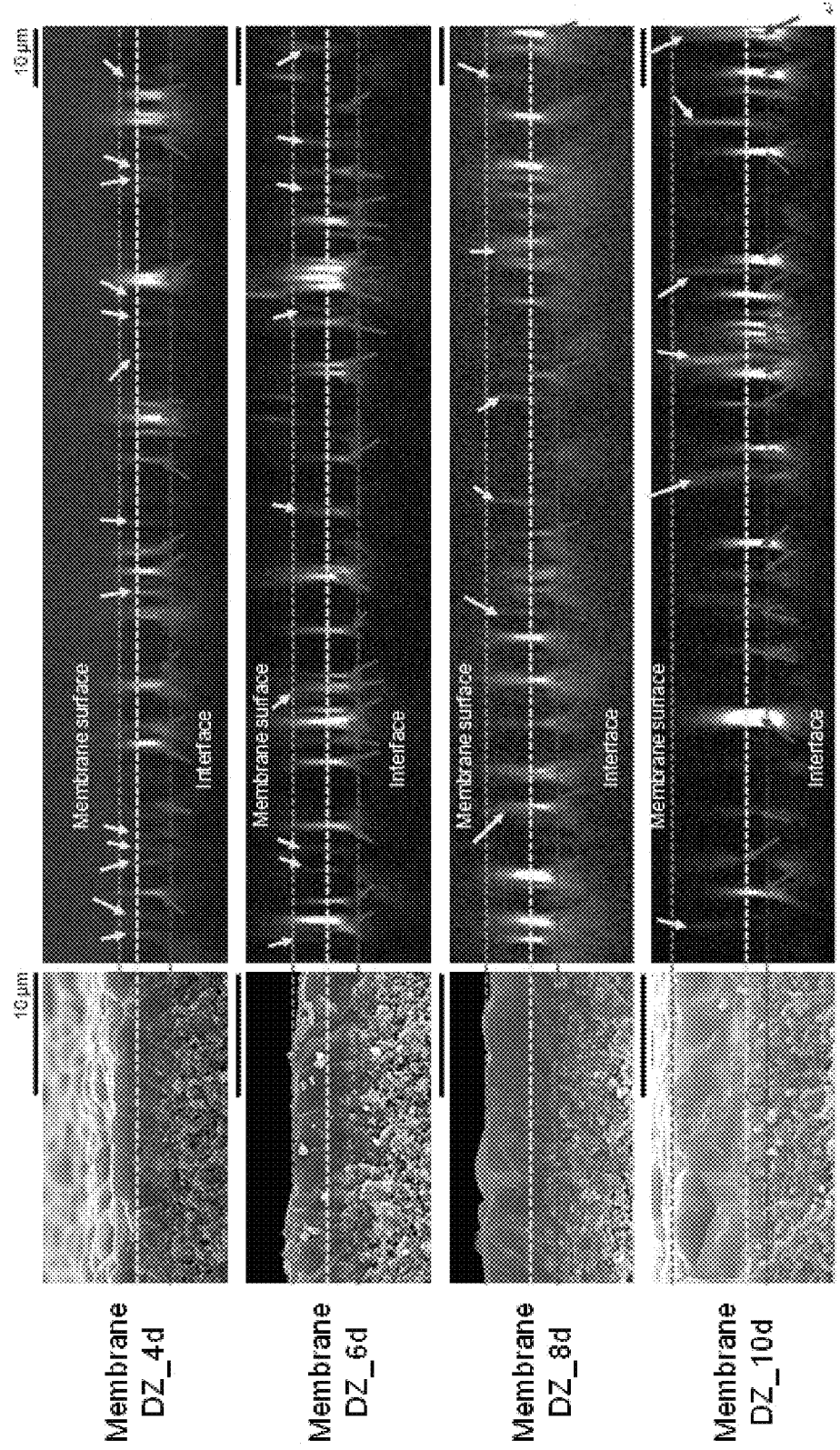
FIG. 16 is a view illustrating cross-sectional view SEM Images and FCOM images of membranes according to Example of the present invention.

In comparison with the SEM image of the seed layer, the bright spots in FIG. 3, panel (a2) may be associated with empty cavities that most likely originated from insufficient inter-growth of the sparsely deposited region of the seed layer (red arrows in FIG. 1, panel (b)). On the other hand, in the membrane DZ_10d, bright spots were observed primarily near the interface (FIG. 3, panels (b2) and (b5), FIG. 13, and FIG. 14), which indicates that a thicker membrane was beneficial for securing the less-defective structures above the region where empty spaces are formed (yellow lines in FIG. 3, panel (b5)). The generation of crack networks, distinct from the empty spaces (FIG. 15), was inevitable and needs to be minimized in order to reach the theoretically predicted separation performance. In FIG. 15, cross-sectional view FCOM images of the membrane DZ_10d (top) were obtained along the middle translucent white lines on the top view FCOM images (bottom) together with other slices. The top-view FCOM images of membrane DZ_10d (bottom) were obtained at the position designated by the translucent yellow lines in the cross-sectional FCOM images (top). The yellow dashed lines on the cross-sectional view FCOM images indicate cracks (left) and cavities (right) and are further associated with the defect features in the cross-sectional view FCOM images (top). Since the cavities that do not propagate down to the interface (FIG. 3, panels (a5) and (b5)) would not adversely affect the separation performance, the lower density of the crack network in the membrane DZ_10d (FIG. 3, panels (a2), (b2), (a5), and (b5), and FIG. 16) accounts for its marked $CO_2/N_2$ separation performance. The film thickness above the cavities and the number of cavities in the membranes DZ_6d and DZ_8d were in between the values for the membranes DZ_4d and DZ_10d (FIG. 13). As the secondary growth time was increased from 4 days to 10 days, the preferred out-of-plane orientation was intensified (FIG. 1, panel (f)) and concomitantly, the extent of inter-growth among the seed particles after secondary growth was improved, as reflected by the lowered degree of cracks (yellow arrows in FIG. 16). Accordingly, the resulting $CO_2/N_2$ SFs increased monotonically with the synthesis time (FIG. 2, panel (c)). Cavities were also found in the cross-sectional view SEM image but their size was significantly small as compared with that observed in the FCOM image, which indicates the limited spatial resolution of FCOM. Nevertheless, FCOM characterization suggests that the minimization of defects (here, cracks) in the membrane DZ_10d is a key to implementing the intrinsic properties of the oriented, siliceous DDR membranes and thus, to securing high $CO_2/N_2$ separation performance.

Molecular Transport Through DDR Membrane

Figure 6:
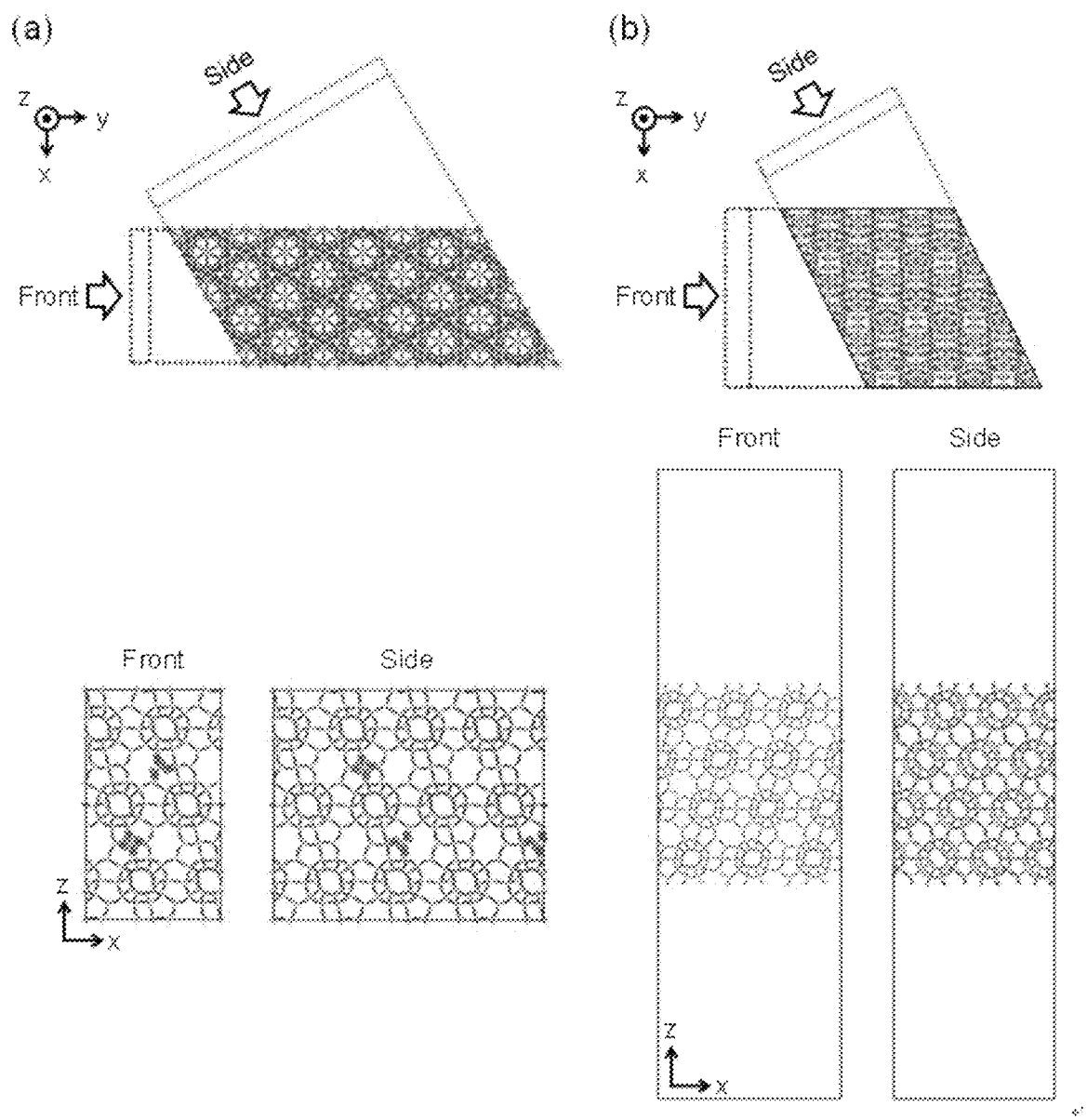
FIG. 6, in panels (a) and (b), shows views illustrating a DDR zeolite crystal model according to Example of the present invention.
Figure 7:
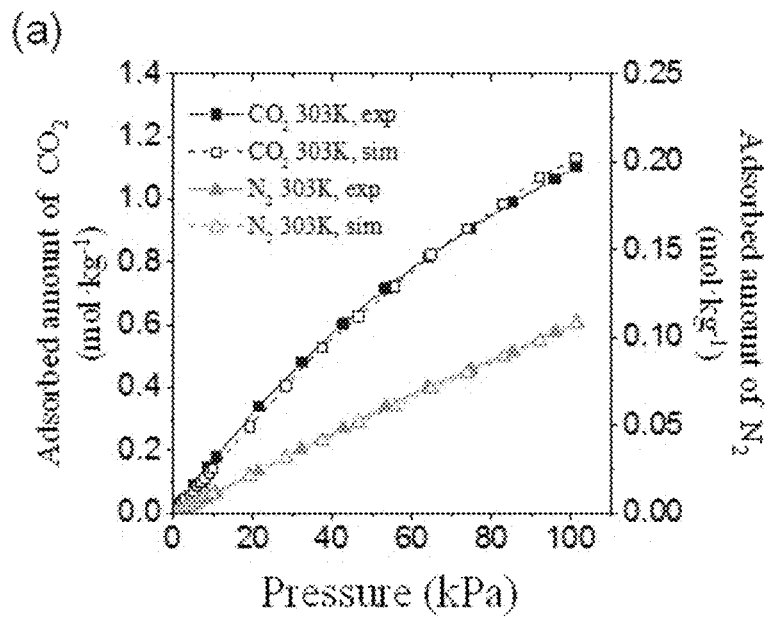
FIG. 7, panel (a), is a view illustrating adsorption isotherms of $CO_2$ (square) and $N_2$ (triangle) single components and FIG. 7, panel (b), is a view illustrating an adsorption isotherm of a $H_2O$ single component, in DDR zeolites at 303 K, obtained from Example (filled symbol) and simulation (open symbol).
Figure 7:
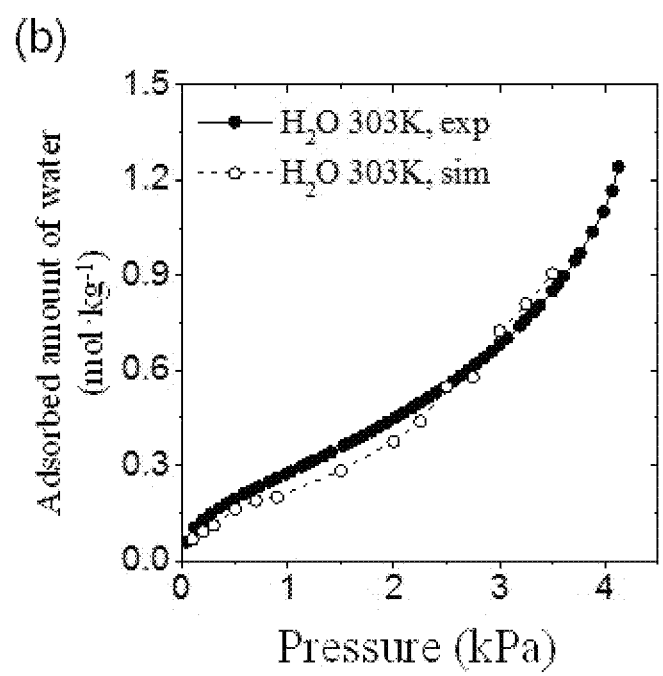
Figure 17:
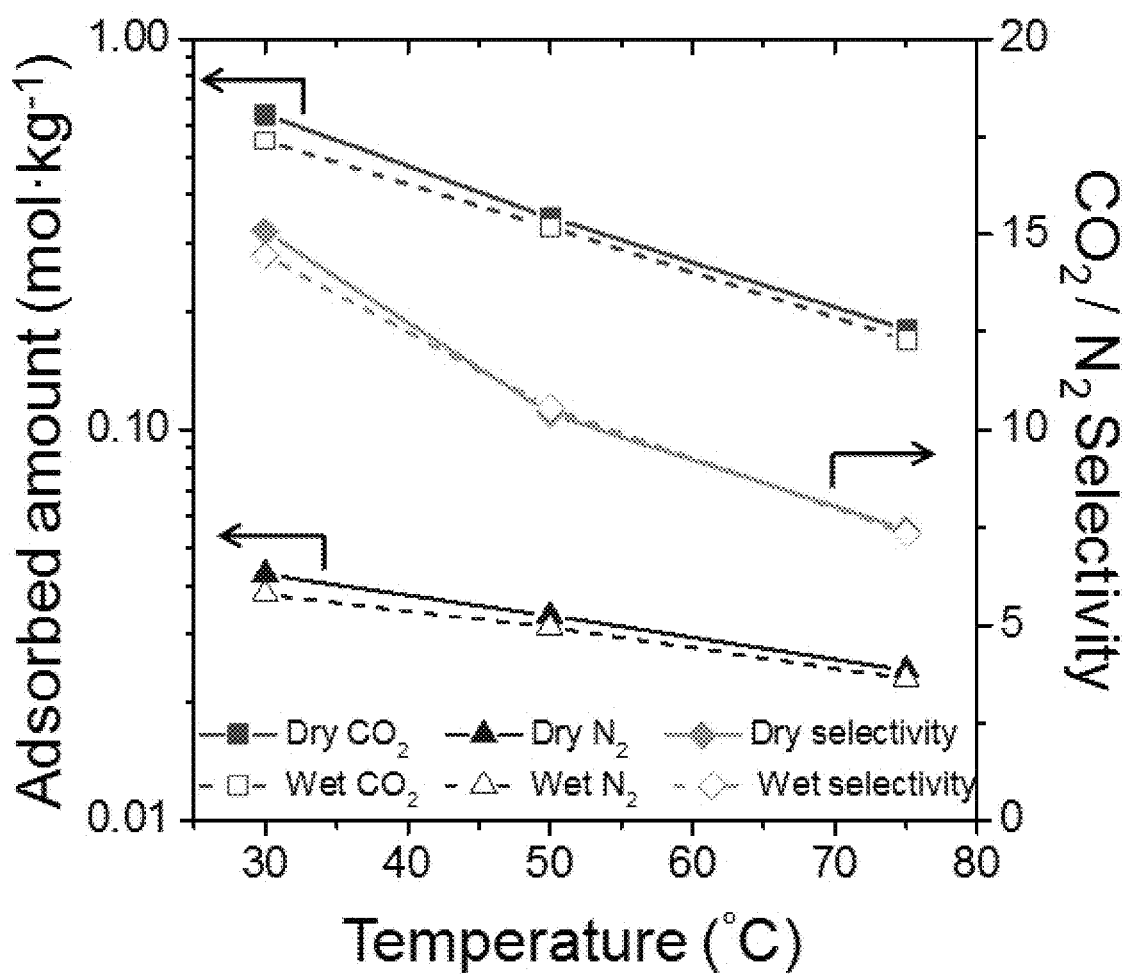
FIG. 17 is a view illustrating adsorbed amounts of $CO_2$ and $N_2$ and their corresponding $CO_2/N_2$ SFs adsorption selectivity through membranes as a function of temperature under dry and wet conditions according to Example of the present invention.

The numbers of adsorbed $CO_2$, $N_2$, and $H_2O$ molecules per DDR zeolite cage (cage, diameter: ~0.8 nm, R. Krishna, *Phys. Chem. Chem. Phys.*, 2015, 17, 39-59; S. E. Jee et al., *J. Am. Chem. Soc.*, 2009, 131, 7896-7904) at partial pressures of 49 kPa, 49 kPa, and 3 kPa (equivalent to the 50:50 WET feed condition) were estimated to be 0.9, 0.07, and 1.0, respectively. Assuming that each cage may contain more than 10 $CO_2$ molecules, all adsorbed molecules may partially occupy the cage and thus, the interaction between the $CO_2$ and $H_2O$ molecules will not be pronounced. In particular, taking into account the partial pressure across a DDR membrane and a decrease in amount of $CO_2$ molecules adsorbed, the diffusion and/or adsorption of the faster permeating species of $CO_2$ near the membrane surface would be critical in determining its overall permeance in the presence of $H_2O$ in the feed. Indeed, the GCMC result in a DDR zeolite model (FIG. 6, panels (a) and (b)) indicates that a degree of interaction between $CO_2$ and $H_2O$ was negligible (FIG. 17), apparently due to the low probability to see each other inside the cage. FIG. 6, panel (a) illustrates a periodic crystal model of 2×4×1 supercell of DDR zeolites, and OH groups, indicated by grey spheres, represent silanol nest defects. FIG. 6, panel (b) illustrates a slab model with the z-axis being perpendicular to the (101) plane of the DDR zeolite, and directions of front and side views are displayed based on an upper end surface. In FIG. 6, panels (a) and (b), bottom two figures are the front (left) and side (right) views of each model.

Figure 4:
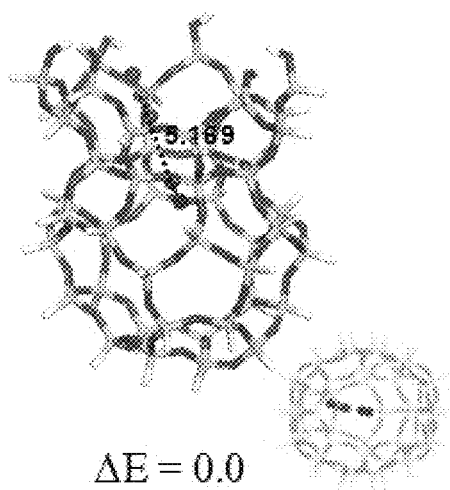
FIG. 4, in panels (a) through (d), shows views illustrating density functional theory (DFT) calculation results in a 48T model under dry and wet conditions according to Example of the present invention.
Figure 4:
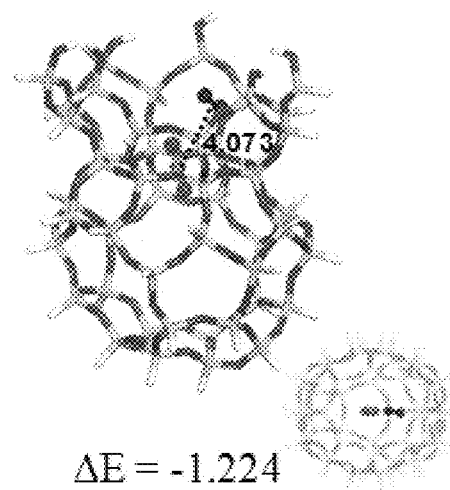
Figure 4:
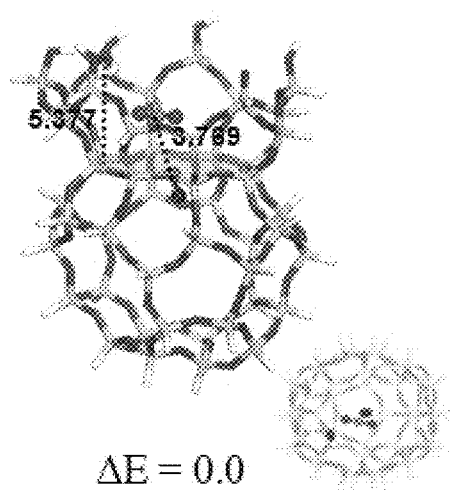
Figure 4:
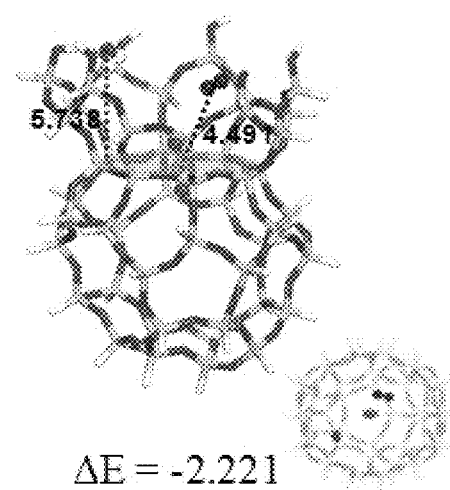
Figure 18:
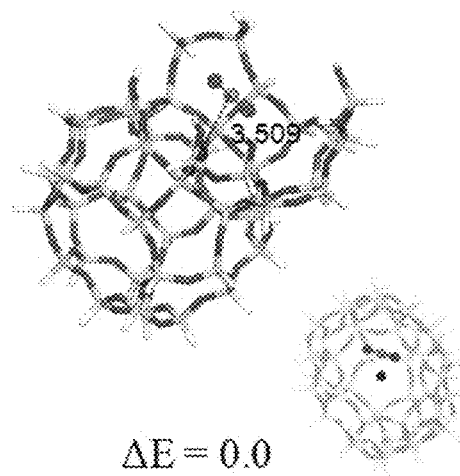
FIG. 18, in panels (a) through (d), shows views illustrating DFT calculation results in a 46T model under dry and wet conditions according to Example of the present invention.
Figure 18:
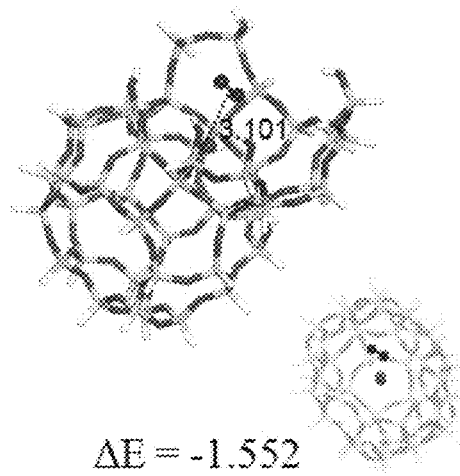
Figure 18:
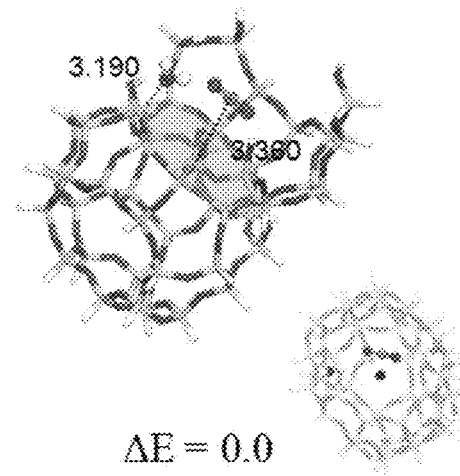
Figure 18:
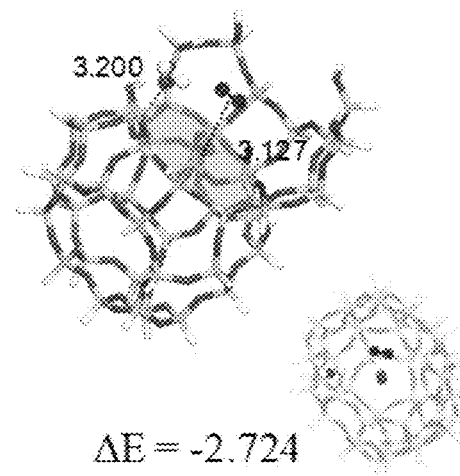
Figure 19:
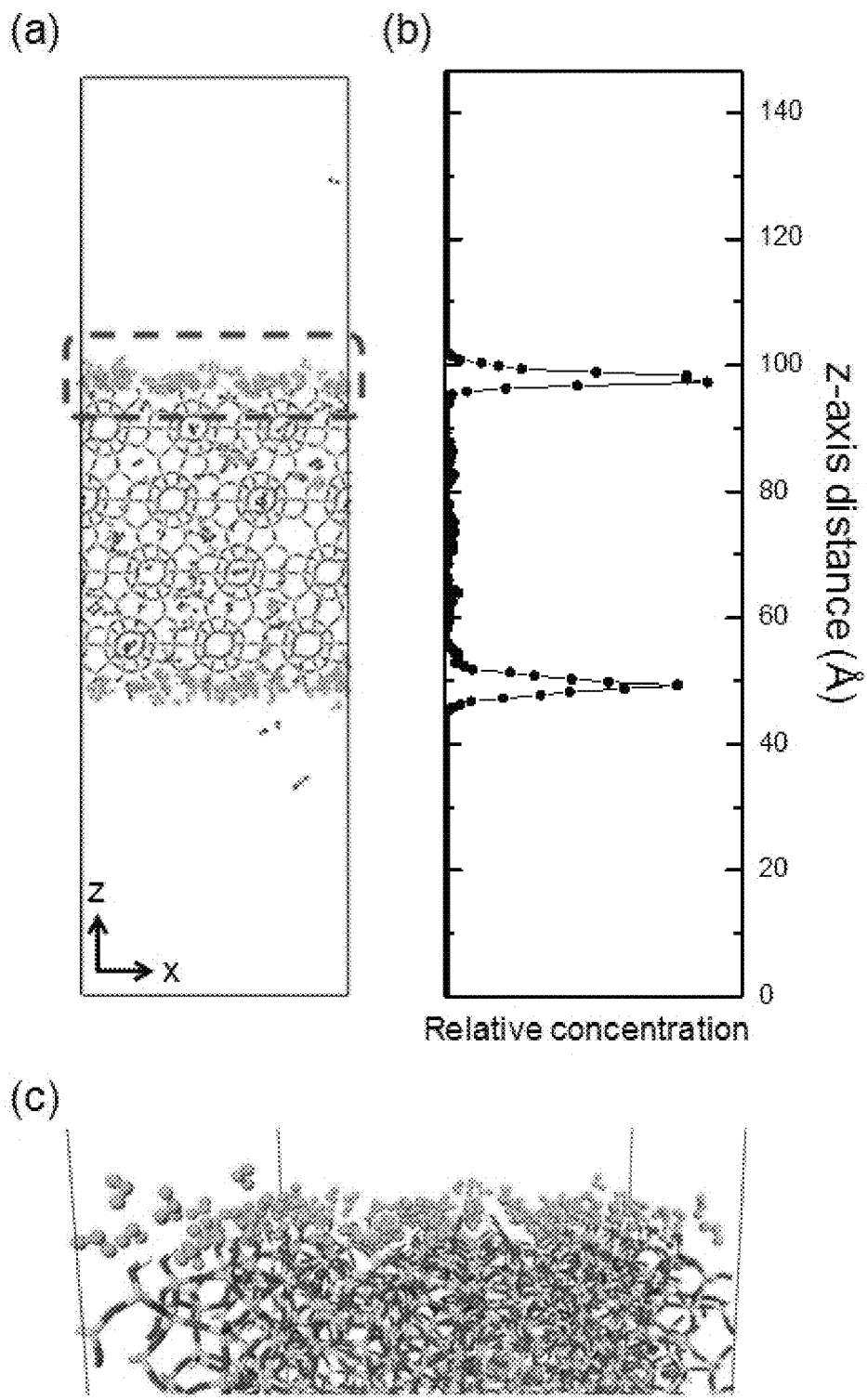
FIG. 19, in panels (a) through (c), shows views illustrating a most stable configuration (FIG. 19, panel (a)) and a relative concentration profile (FIG. 19, panel (b)) of adsorbed molecule, and an enlarged image (FIG. 19, panel (c)) of a region displayed in FIG. 19, panel (a) on a slab model according to Example of the present invention.

Given the sufficient intergrowth in membrane DZ_10d, as supported by FCOM characterizations (FIG. 3, panels (a1) through (b5)), it may be predicted that the presence of a surface resistance (or barrier) affecting $CO_2$ and $N_2$ in the presence of $H_2O$. The adsorption of $CO_2$ was less disfavored by $H_2O$ molecules on the zeolite surface in view of thermodynamics based on the density functional theory (DFT) calculation (FIG. 4, panels (a) through (d)). Particularly, a total of four cases were investigated in the 48T model, where $N_2$ and $CO_2$ were located at the pore window (or mouth) of the DDR cage and near the surface, respectively, and vice versa, with and without water. Under the dry condition, the configuration of $CO_2$ at the pore window was more stable than that of $N_2$ at the pore window by $-1.224$ kcal·mol$^{-1}$ (FIG. 4, panels (a) and (b)). A $H_2O$ molecule led to an increase in the energy stabilization from $-1.224$ to $-2.221$ kcal·mol$^{-1}$ for the same configuration. This result supports that through interaction with $H_2O$ on the surface, $CO_2$ and $N_2$ were drawn toward and slightly away from the pore window, respectively (FIG. 4, panels (c) and (d)). Further, it was confirmed that this stabilization effect was more pronounced, when the $H_2O$ molecule was a little closer to the pore window (FIG. 18, panels (a) through (d)). Furthermore, the GCMC result with the slab model (FIG. 6, panel (b)) revealed that $H_2O$ molecules were sufficiently present in the surface of the DDR zeolite (FIG. 19, panels (a) through (c)). Therefore, the interaction between $H_2O$ and $CO_2/N_2$ mixtures on the surface was a key to determining surface resistance related to their entering the DDR zeolite pore mouth. The DFT results (FIG. 4, panels (a) through (d)) and GCMC results (FIG. 19, panels (a) through (c)) reveal that the transport of $N_2$ was more impeded by $H_2O$ adsorbed on the membrane surface and consequently, the $CO_2/N_2$ SF through siliceous DDR membranes could increase under the wet condition. Although such surface resistance was previously reported as evidence for the adsorption of guest molecules into zeolite powders (J. C. Saint Remi et al., *Nat. Mater.*, 2016, 15, 401-406; L. Zhang et al., *Chem. Commun.*, 2009, 6424-6426), it may be appreciated in the present invention that the surface resistance in a permeation process through the membranes as described above has a beneficial effect on enhancing the separation performance (here, favoring $CO_2$) of membranes.

Correlation Between Separation Performance and Membrane Characteristics

Along with the defective structure, we made an effort to correlate the separation performance of DDR membranes with their representative compositional and structural properties. A graph illustrating the max $CO_2/N_2$ SFs (50:50 DRY and 50:50 WET) against the CPO values and the contact angles of the water droplet, respectively, for all DDR membranes was plotted (FIG. 5, panel (a)). Except for the membrane DZ_4d, which showed a very low $CO_2/N_2$ SF of ~1.0 (FIG. 2, panel (c) and FIG. 12, panels (a1) and (a2)), the linear correlation for both quantities held well for the other membranes (membranes DZ_6d, DZ_8d, and DZ_10d). This indicates that the increase in both hydrophobicity and the preferred out-of-plane orientation in the DDR membranes is a sound approach to achieve a high $CO_2/N_2$ separation performance in the presence of $H_2O$. Compared with hydrophobicity of a well-known zeolitic imidazolate framework-8 (ZIF-8), on which the contact angle of a water droplet is ~60 to 70°, the membrane DZ_10d had a contact angle of ~87° (FIG. 5, panel (a)) and thus, can be regarded as highly hydrophobic.

Evaluation of $CO_2/N_2$ Separation Performance of DDR Membranes

The membrane DZ may reliably provide high $CO_2/N_2$ SFs in a temperature range where humidity considerably disfavors the $CO_2/N_2$ separation performance of hydrophilic zeolite membranes (X. H. Gu, et al., *Ind. Eng. Chem. Res.*, 2005, 44, 937-944). For example, although the hydrophilic faujasite (FAU) zeolites (NaX, Si/Al ratio: ~1 to 1.5) exhibit high adsorption capability for $CO_2$ under the dry condition, a trace amount of $H_2O$ negates the $CO_2$ adsorption (Y. Wang et al., *J. Chem. Eng. Data*, 2009, 54, 2839-2844; Y. Wang et al., *J. Chem. Eng. Data*, 2010, 55, 3189-3195). Therefore, the hydrophilic FAU zeolite membranes are appropriate for a $CO_2$ separation process only under the dry condition (K. Kusakabe, T. Kuroda, S. Morooka, *J. Membr. Sci.*, 1998, 148, 13-23), but are not suitable for post-combustion carbon absorption. Actually, NaY zeolites (FAU type, Si/Al ratio: ~1.5 to 3), though less hydrophilic compared with NaX, have been used to constitute a membrane for $CO_2$ separations under the dry condition (K. Kusakabe et al., *AIChE J.*, 1999, 45, 1220-1226). However, their separation performance is highly likely to be attenuated under the wet condition (X. H. Gu et al., *Ind. Eng. Chem. Res.*, 2005, 44, 937-944).

Apart from the FAU zeolites, 8-MR all-silica chabazite (CHA) zeolite with a pore channel size of 0.37×0.42 nm$^2$, which is slightly larger than that of the DDR zeolite, also exhibited excellent $CO_2/N_2$ separation performance (H. Kalipcilar et al., *Chem. Mater.*, 2002, 14, 3458-3464). Highly siliceous CHA membranes that showed good $CO_2/N_2$ SFs (~10) under the dry condition but exhibited increased $CO_2/N_2$ SFs (~18) at the total feed pressure of 6 bar under the wet condition, which is similar to the trend of the membrane DZ_10d (11.9±0.6 under 50:50 DRY vs.

15.9±1.1 under 50:50 WET) (FIG. 2, panels (a) and (b)) (N. Kosinov et al., *J. Mater. Chem. A*, 2014, 2, 13083-13092). Nevertheless, the CHA membrane exhibited a monotonic decrease in $CO_2/N_2$ SFs with the max value being observed at ~20° C. under the wet condition; recall that the membrane DZ_10d showed the $CO_2/N_2$ SFs of 12.7 to 18.2 in the desired temperature range of ~50-75° C. (FIG. 2, panels (b) and (f)) (T. C. Merkel et al., *J. Membr Sci.*, 2010, 359, 126-139). This undesirable monotonically-decreasing trend depending on the temperature was also reported in other CHA membranes post-treated with a chemical vapor deposition method (E. Kim et al., *Environ. Sci. Technol.*, 2014, 48, 14828-14836). Nevertheless, the hydrophobic feature in the CHA membranes was proven to be effective for preserving a high $CO_2/N_2$ SF under the wet condition. On the contrary, SAPO-34 zeolites, while they share the identical CHA structure, are likely to be adversely affected by $H_2O$ vapor in the range of ~50 to 75° C., but, only the $CO_2/N_2$ SFs at ~100° C. were reported under the dry and wet conditions and were comparable to each other (S. G. Li et al., *Ind. Eng. Chem. Res.*, 2010, 49, 4399-4404).

Figure 5:
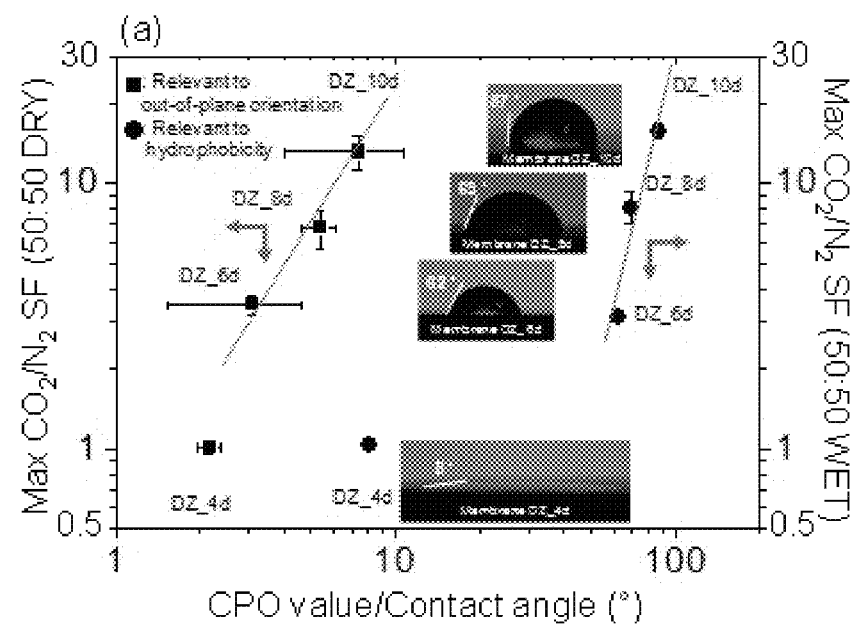
FIG. 5, in panels (a) and (b), shows views illustrating Max $CO_2/N_2$ SFs (50:50 DRY and 50:50 WET) vs. CPO values of the membrane according to Example of the present invention, and contact angles of a water droplet for the membranes.
Figure 5:
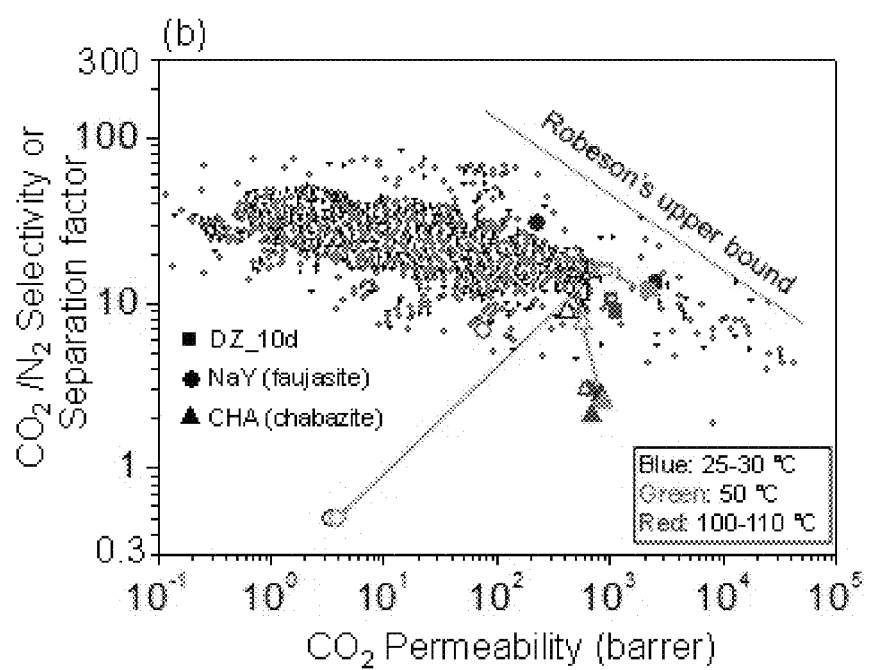

In FIG. 5, panel (b), the separation performances of the membrane DZ_10d and the above-mentioned NaY and post-treated CHA zeolite membranes, which were tested under both dry and wet conditions (directly relevant to the flue-gas stream), and the separation performance of polymeric membranes were compared together. The membrane DZ_10d showed significantly large $CO_2/N_2$ SFs under the wet condition at 50 and 100° C. This temperature-insensitive separation performance, mainly ascribed to the hydrophobicity of the membrane DZ-10d itself (associated with the beneficial surface resistance in FIG. 4, panels (a) through (d)), such that the membrane DZ-10d is suitable for effective post-combustion carbon capture. The $CO_2/N_2$ separation performance of the membrane DZ_10d was still below Robeson's upper bound. However, since $CO_2/N_2$ selectivity in the present invention was obtained with respect to the $CO_2/N_2/H_2O$ mixtures and was not estimated from the single gas permeances of $CO_2$ and $N_2$, the membrane according to the present invention is quite competitive. Although any energy saving based on securing high $CO_2/N_2$ SFs under the wet condition should be further evaluated by a process simulation (T. C. Merkel et al., *J. Membr Sci.*, 2010, 359, 126-139; H. B. Zhai et al., *Environ. Sci. Technol.*, 2013, 47, 3006-3014), since $H_2O$ needs to be completely removed in the feed in order to ensure dry feeding, this is not desirable in consideration of additional cost caused thereby (M. T. Snider et al., *Micropor Mesopor Mater.*, 2014, 192, 3-7). This reason leads to conclusion that the method of preparing h0h-oriented, hydrophobic DDR zeolite membranes is preferable.

In order to ultimately compete with the polymer membranes that have the two main merits of low cost and high processability, the molar flux across the membrane DZ_10d should be further increased by at least 10 times so as to be economically viable (T. C. Merkel et al., *J. Membr Sci.*, 2010, 359, 126-139; H. B. Zhai et al., *Environ. Sci. Technol.*, 2013, 47, 3006-3014). While the $CO_2/N_2$ SF increased from ~1.0 for membrane DZ_4d to ~13.2 for membrane DZ_10d (FIG. 2, panel (c)), the corresponding $CO_2$ permeance did not decrease as much. This result indicates that the transport resistance through bare supports largely limits the apparent permeation rates and therefore, the use of high-flux asymmetric supports will be effective for resolving the low flux problem (J. Hedlund et al., *Micropor Mesopor Mater.*, 2002, 52, 179-189; K. V. Agrawal et al., *Adv. Mater.*, 2015, 27, 3243-3249).

INDUSTRIAL APPLICABILITY

According to the present invention, a hydrophobic DDR zeolite membrane may be prepared with high reproducibility, and particularly, a DDR zeolite membrane having an out-of-plane orientation in which a specific plane is formed in parallel with the membrane and thus the pore structure is aligned in a direction perpendicular to this specific plane may be prepared.

Further, the hydrophobic DDR zeolite membrane having out-of-plane orientation is not affected by a temperature and a pressure of flue gas but may exhibit high separation performance under moisture-containing feed conditions.

Although the present invention has been described in detail based on particular features thereof, and it is obvious to those skilled in the art that these specific technologies are merely preferable embodiments and thus the scope of the present invention is not limited to the embodiments. Therefore, the substantial scope of the present invention is defined by the accompanying claims and equivalent thereof.

What is claimed is:

1. A method of preparing a DDR (decadodecasil 3R) type zeolite membrane comprising:
    (a) hydrothermally synthesizing DDR type zeolite particles through a seed growth by adding DDR type zeolite particles to a synthetic precursor containing 1-adamantanamine and forming a seed layer by depositing DDR type zeolite particles on a porous substrate; and
    (b) preparing a hydrophobic DDR type zeolite membrane through a second seed growth by adding the substrate on which the seed layer is formed to a silica source synthetic precursor that contains a silica source and a methyltropinium salt and performing a hydrothermal synthesis,
    wherein the hydrophobic DDR type zeolite membrane has an out-of-plane orientation in which a specific plane is formed in parallel with the membrane surface and a pore structure perpendicular to the specific plane is aligned in a direction along the membrane thickness.

2. The method of preparing a DDR type zeolite membrane according to claim 1, the methyltropinium salt is one or more selected from the group consisting of methyltropinium iodide, methyltropinium fluoride, methyltropinium chloride, methyltropinium bromide, and methyltropinium hydroxide.

3. The method of preparing a DDR type zeolite membrane according to claim 1, wherein the silica source synthetic precursor in step (b) comprises $SiO_2$:methyltropinium salt: $NaOH:H_2O$ at a molar ratio of 100:1-1000:0-1000:10-100000.

4. The method of preparing a DDR type zeolite membrane according to claim 1, after step (b), further comprising a step (c) of activating the membrane by calcining the membrane at 300 to 900° C. for 1 to 240 hours.

5. The method of preparing a DDR type zeolite membrane according to claim 1, the porous substrate is made of one or more selected from the group consisting of alumina, polypropylene, polyethylene, polytetrafluoroethylene, polysulfone, polyimide, silica, glass, mullite, zirconia, titania, yttria, ceria, vanadia, silicon, stainless steel, and carbon.

6. The method of preparing a DDR type zeolite membrane according to claim 1, the step (b) is performed at 70 to 250° C. for 1 to 960 hours.

7. The method of preparing a DDR type zeolite membrane according to claim 1, the DDR type zeolite particle in the step (a) is obtained by adding DDR particles already obtained by a non-seeded growth method to a synthetic precursor containing ADA, EDA, SiO$_2$ and H$_2$O at a ratio of 1-100:10-1000:100:100-100000 and performing hydrothermal synthesis at 100 to 200° C. for 1 to 240 hours.

8. A DDR type zeolite membrane prepared by a method according to claim 1.

9. A method of separating CO$_2$ from a mixture of a small molecule selected from the group consisting of CH$_4$, N$_2$, O$_2$, C$_2$H$_4$, C$_2$H$_6$, C$_3$H$_6$, and C$_3$H$_8$, and CO$_2$ using the DDR type zeolite membrane of claim 8.

* * * * *

UNITED STATES PATENT AND TRADEMARK OFFICE
CERTIFICATE OF CORRECTION

PATENT NO. : 10,537,855 B2
APPLICATION NO. : 15/860556
DATED : January 21, 2020
INVENTOR(S) : Jungkyu Choi It is certified that error appears in the above-identified patent and that said Letters Patent is hereby corrected as shown below:

On the Title Page

On Page 2 Column 1, under References Cited, OTHER PUBLICATIONS, Line 21 in the title of the cited reference of Kim, E. et al., "Chemical Vapor Deposition on Chabazite (CHA) Zeolite Membranes for lective Post-Combustion CO2 Capture", the word "lective", should be -- Elective --.

On Page 2 Column 2, under References Cited, OTHER PUBLICATIONS, Line 21 the page number identified in the citation of Snider, M.T., et al., "pp 37", should be -- pp 3-7 --.

Signed and Sealed this
Third Day of March, 2020

Andrei Iancu
*Director of the United States Patent and Trademark Office*